United States Patent
Russell et al.

[11] Patent Number: 6,107,956
[45] Date of Patent: Aug. 22, 2000

[54] AUTOMOTIVE FORWARD LOOKING SENSOR ARCHITECTURE

[75] Inventors: Mark E. Russell, Westford; William F. Miccioli, Waltham, both of Mass.

[73] Assignee: Raytheon Company, Lexington, Mass.

[21] Appl. No.: 09/359,868

[22] Filed: Jul. 26, 1999

Related U.S. Application Data

[63] Continuation of application No. 08/975,820, Nov. 21, 1997, Pat. No. 5,929,802.

[51] Int. Cl.[7] .................................................... G01S 13/93
[52] U.S. Cl. .............................. 342/70; 342/81; 342/157; 342/158
[58] Field of Search ................................ 342/70, 71, 72, 342/81, 157, 158; 701/119, 118, 117, 301

[56] References Cited

U.S. PATENT DOCUMENTS

| | | | |
|---|---|---|---|
| Re. 36,095 | 2/1999 | Urabe et al. | 342/133 |
| 3,898,652 | 8/1975 | Rashid | 343/6 R |
| 4,316,173 | 2/1982 | Matsumura et al. | 340/32 |
| 4,346,774 | 8/1982 | Hirota et al. | 180/167 |
| 4,532,520 | 7/1985 | Hislop | 343/373 |
| 4,567,484 | 1/1986 | Schilz et al. | 343/14 |
| 4,771,288 | 9/1988 | Johnson | 342/188 |
| 4,931,799 | 6/1990 | Wen et al. | 342/110 |
| 5,045,856 | 9/1991 | Paoletti | 342/70 |
| 5,061,933 | 10/1991 | Macomber et al | 342/128 |
| 5,172,123 | 12/1992 | Johnson | 342/200 |
| 5,332,057 | 7/1994 | Butsuen et al. | 180/169 |
| 5,345,243 | 9/1994 | Levis | 342/173 |
| 5,369,409 | 11/1994 | Urabe et al. | 342/133 |
| 5,369,591 | 11/1994 | Broxmeyer | 364/461 |
| 5,428,359 | 6/1995 | Yoneyama et al. | 342/70 |
| 5,448,244 | 9/1995 | Komatsu et al. | 342/155 |
| 5,495,255 | 2/1996 | Komatsu et al. | 342/175 |
| 5,512,901 | 4/1996 | Chen et al. | 342/175 |
| 5,572,428 | 11/1996 | Ishida et al. | 364/461 |
| 5,619,208 | 4/1997 | Tamatsu et al. | 342/70 |
| 5,627,511 | 5/1997 | Takagi et al. | 340/435 |
| 5,633,642 | 5/1997 | Hoss et al. | 342/70 |
| 5,652,589 | 7/1997 | Ono et al. | 342/70 |
| 5,717,399 | 2/1998 | Urabe et al. | 342/70 |
| 5,784,023 | 7/1998 | Bluege | 342/104 |
| 5,818,383 | 10/1998 | Stockburger et al. | 342/109 |
| 5,905,472 | 5/1999 | Wolfson et al. | 343/772 |
| 5,929,802 | 7/1999 | Russell et al. | 342/70 |
| 5,933,109 | 8/1999 | Tohya et al. | 342/175 |

FOREIGN PATENT DOCUMENTS

| | | |
|---|---|---|
| 05254896 | 3/1995 | European Pat. Off. . |
| 0649776 | 4/1995 | European Pat. Off. . |
| 0654679 | 5/1995 | European Pat. Off. . |
| 0690315 | 1/1996 | European Pat. Off. . |
| 0805360 | 11/1997 | European Pat. Off. . |
| 19523693 | 5/1998 | Germany . |
| 402259415A | 10/1990 | Japan ........................ G01C 21/04 |
| 406148330A | 5/1994 | Japan ........................ G01S 17/88 |
| 9002985 | 3/1990 | WIPO . |
| 9838524 | 9/1998 | WIPO . |

*Primary Examiner*—John B. Sotomayor
*Attorney, Agent, or Firm*—Daly, Crowley & Mofford, LLP

[57] ABSTRACT

A Forward Looking Sensor (FLS) alignment system includes a transmit antenna adapted to provide multiple beams, a receive antenna adapted to provide multiple beams, a transmitter coupled to said transmit antenna and adapted to radiate an electromagnetic signal through selected ones of the multiple antenna beams of said transmit antenna and a receiver coupled to said receive antenna and adapted to receive through selected ones of the multiple antenna beams of predetermined antenna beams of a receive antenna having multiple antenna beams reflections from the radiated electromagnetic signal and processing the received electromagnetic signal reflections to generate an alignment offset signal.

12 Claims, 14 Drawing Sheets

AUTOMOTIVE FORWARD LOOKING SENSOR ARCHITECTURE

CROSS-REFERENCE TO RELATED APPLICATIONS

This application is a continuation of application Ser. No. 08/975,820 filed on Nov. 21, 1997 now U.S. Pat. No. 5,929,802.

BACKGROUND OF THE INVENTION

In view of the dangers associated with automobile travel, there is an ongoing need for enhanced automobile safety features. One possible area of increased automobile safety involves the vehicle's cruise control system. A cruise control system permits an operator to set a predetermined speed of travel and controls the vehicle to maintain the predetermined speed. However, as the vehicle approaches obstacles, such as other cars and pedestrians, driver attention and intervention are necessary to actuate the vehicle's brakes thus overriding the cruise control system and avoiding collisions.

To enhance the safety of cruise control systems, "intelligent" cruise control systems have been suggested. Intelligent cruise control systems typically include a detector for detecting obstacles in the path of the vehicle and a controller for actuating the vehicle's brakes and overriding the cruise control system in response to the detection of obstacles. Advantageously, intelligent cruise control systems can reduce the dependency on the driver for avoiding collisions.

Another possible area of increased automobile safety is in collision avoidance systems. Like intelligent cruise control systems, collision avoidance systems generally include a detector for detecting obstacles in the path of the vehicle and a controller for actuating the vehicle's brakes in response to detected obstacles in order to avoid collisions.

In both the intelligent cruise control and collision avoidance applications, it is necessary to provide a detector capable of accurately and reliability detecting objects in the path of the vehicle. Such a detector is sometimes referred to as a Forward Looking Sensor (FLS) and must be relatively insensitive to the relative location of the automobile and obstacles and environmental conditions, such as temperature, humidity, ice and rain.

Radar is a suitable technology for implementing an automotive FLS. One type of radar suitable for this purpose is Frequency Modulated Continuous Wave (FMCW) radar. In typical FMCW radar, the frequency of the transmitted CW signal linearly increases from a first predetermined frequency to a second predetermined frequency. FMCW radar has the advantages of high sensitivity, relatively low transmitter power and good range resolution.

Because the FLS is a consumer product which may affect the safety of vehicles, the accuracy and reliability of the sensor are tantamount. Aspects of the FLS which contribute to its accuracy and reliability include its susceptibility to noise and the overall precision with which received RF signals are processed to detect objects within the field of view of the FLS. Susceptibility to noise for example can cause false detections and, even more deleteriously, cause an object to go undetected.

Further significant attributes of the FLS are related to its physical size and form factor. Preferably, the FLS is housed in a relatively small enclosure mountable behind the forward surface of the vehicle's engine housing, or grill. For accuracy and reliability, it is imperative that the transmit and receive antenna and circuitry are unaffected by attributes of the vehicle grill and are mounted to the vehicle in a predictable alignment.

SUMMARY OF THE INVENTION

In view of the above problems and limitations of existing automotive sensor systems and in accordance with the present invention, it has been recognized that combining the need for increased automotive safety with the usefulness and desirability of automotive sensor systems leads to the problem of providing an automotive sensor system which is both compact, accurate and reliable given the environmental and other operating conditions of the automotive sensor must operate. It would, therefore, be desirable to provide an automotive sensor which is compact, can accurately detect objects in a vehicle environment and which is reliable.

In accordance with the present invention, an automotive forward looking sensor (FLS) includes (a) a voltage controlled oscillator (VCO) having an input port to which a VCO control signal comprising at least one of a ramp up portion and a ramp down portion is coupled and an output port at which a transmit RF signal is provided for coupling to a transmit antenna and (b) a linearization circuit having a first input port to which a feedback signal proportional to the transmit RF signal is coupled, a second input port to which a fixed frequency reference signal is coupled and an output port at which an error signal proportional to at least one of a phase difference and a frequency difference between the feedback signal and the fixed frequency reference signal is provided, wherein the VCO control signal is a function of the error signal and wherein the at least one ramp up portion and ramp down portion has a substantially linear slope. With this particular arrangement, an FLS which can accurately detect objects in and adjacent to a vehicle path is provided. In one embodiment, the FLS includes an antenna assembly having thirteen antenna beams. The use of multiple antenna beams allows multiple objects at distances in the range of about 100 meters to 200 or more meters from the FLS to be accurately resolved.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
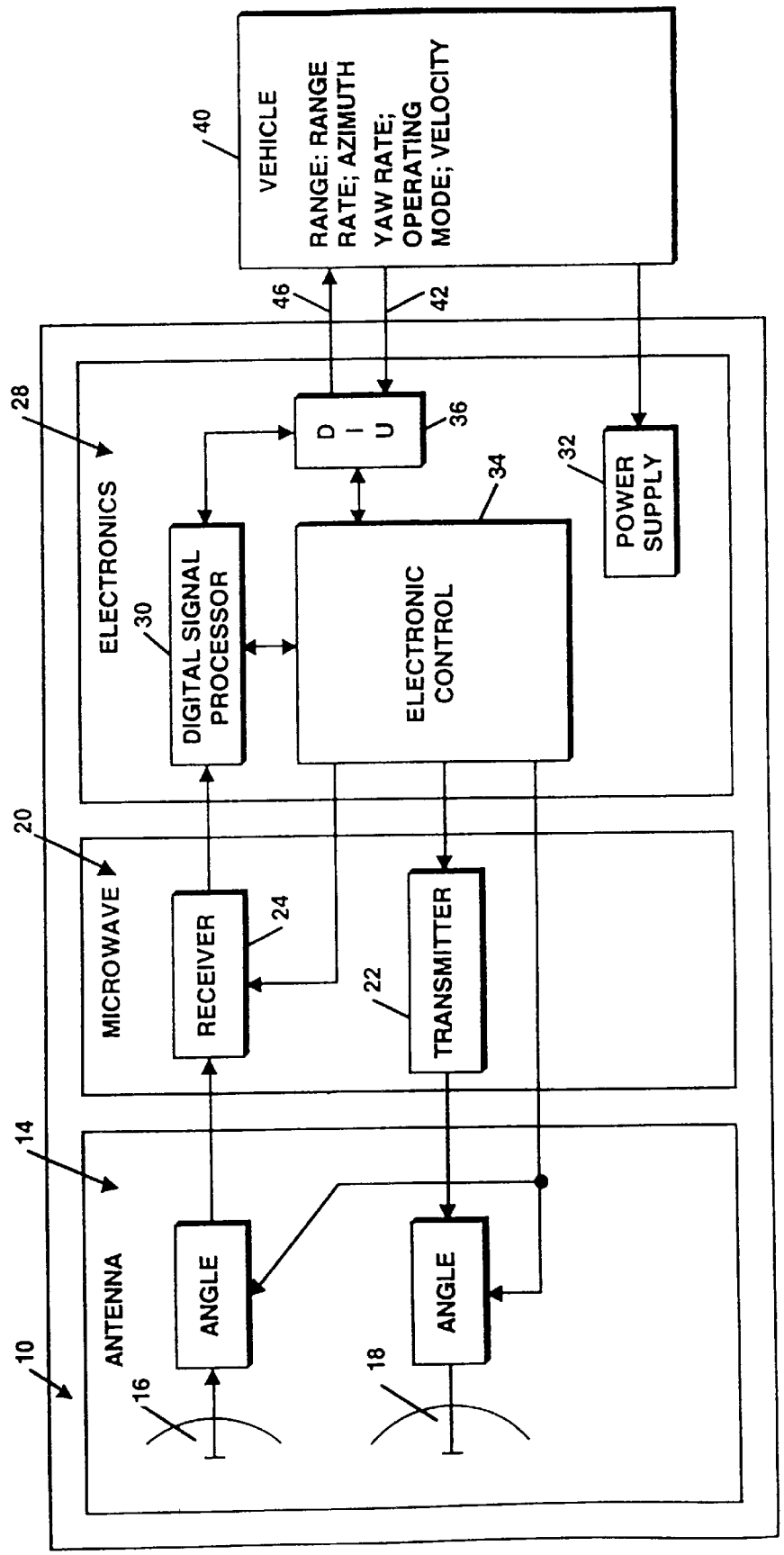
FIG. 1 is a block diagram of an automotive Forward Looking Sensor (FLS)

Referring to FIG. 1, an automotive Forward Looking Sensor (FLS) 10 includes an antenna assembly 14, a microwave assembly 20 having both a transmitter 22 and a receiver 24, and an electronic assembly 28, consisting of a signal processor 30, power supplies 32, control circuits 34 and a digital interface 36. The automotive FLS 10 utilizes radar technology and is adapted for mounting on an automobile 40 to detect one or more objects, or targets in the field of view of the FLS. In this application, the targets include other cars, trees, signs, pedestrians, etc. . . . The FLS 10 detects one or more targets in its field of view and classifies each target as either a "primary" target or a "secondary" target. The primary, or lead target may be defined in various ways and, in the illustrative embodiment, is the closest object in the trajectory, or lane of travel the automobile on which the FLS 10 is mounted.

Control signals are provided by the vehicle 40 to the FLS 10 via a control signal bus 42. These control signals include a yaw rate signal corresponding to a yaw rate associated with the vehicle 40 and a velocity signal corresponding to the velocity of the vehicle. In response to these control signals and reflected RF signals received by the FLS 10, the FLS provides one or more output signals characterizing the primary target within its field of view via an output signal bus 46 to the vehicle. These output signals include a range signal indicative of a range associated with a primary target in the field of view of the sensor 10, a range rate signal indicative of a range rate associated with the primary target and an azimuth signal indicative of the azimuth associated with the primary target relative to the vehicle 40. The FLS output signals may be coupled to a longitudinal control unit of the vehicle 40 for use in an intelligent cruise control or collision avoidance system.

The antenna assembly 14 includes two antenna, a receive antenna 16 for receiving RF signals and a transmit antenna 18 for transmitting RF signals. The FLS 10 may be characterized as a bi-static radar sensor since it includes separate transmit and receive antennas. The antennas 16, 18 are multi-lobed and are controlled in parallel as to point in the same direction. Various circuitry for selecting the angle of the respective antennas 16, 18 is suitable, including a multi-position switch.

The output from the receive antenna 16 is coupled to the microwave receiver 24, where one or more local oscillator signals are offset in frequency from the transmitted signal frequency by a fixed amount. The output signal of the receiver 24 is at an offset frequency, with the target frequencies either above or below it.

The receiver 24 includes an analog-to-digital (A/D) converter which samples an amplified version of the received RF signal at a rate at least twice the largest frequency out of the receiver. These signal samples are processed by an FFT within the digital signal processor 30 in order to determine the content of the signal within various frequency ranges (i.e., frequency bins). The FFT outputs serve as data for the rest of the signal processor 30. The remaining parts of the FLS 10 are standard items, including power supply 32, control circuits 34, including a system clock (crystal controlled oscillator) for frequency stability, and digital interface 36.

The manner by which the signal processor 30 processes received RF signals to provide the above-described output signals via the output signal bus 46 to the vehicle 40 indicative of range, range rate and/or azimuth of a primary target is described below in conjunction with the flow diagram of FIG. 10 and in a co-pending U.S. patent application Ser. No. 08/745,530, entitled RADAR SYSTEM AND METHOD OF OPERATING SAME, filed on Nov. 12, 1996, which is incorporated herein by reference in its entirety.

Figure 2:
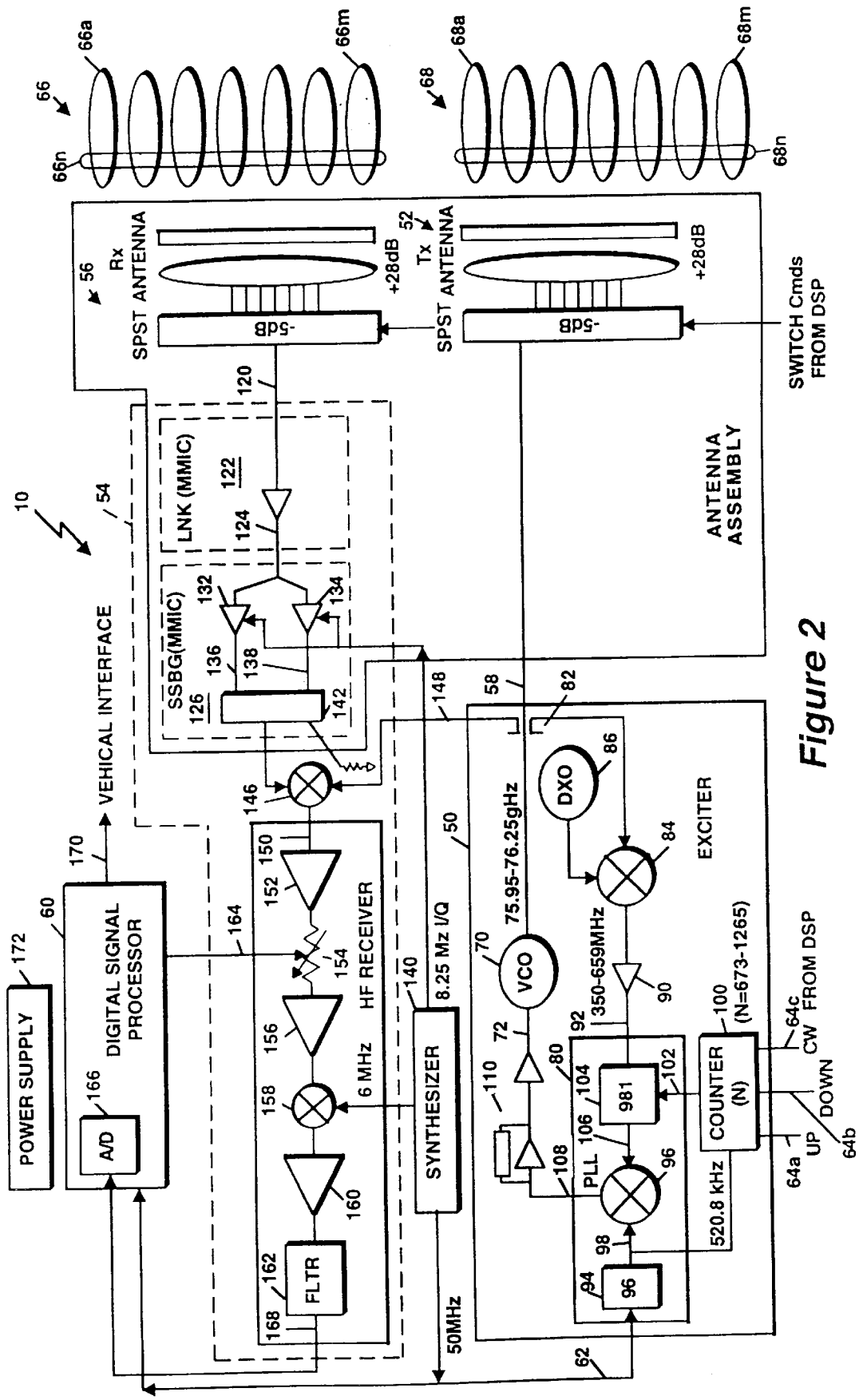
FIG. 2 is a detailed block diagram of a preferred embodiment for the automotive FLS of FIG. 1.

Referring to the block diagram of FIG. 2, a preferred FLS 10 includes a transmit signal path provided by transmitter circuit 50 and transmit antenna 52 and a receive signal path provided by a receiver circuit 54 and receive antenna 56. In general overview, the FLS 10 generates a transmitter signal with transmitter circuit 50 for coupling to the transmit antenna 52 via signal path 58. The transmitted RF signal intercepts objects in the field of view (FOV) of the FLS 10 and portions of the transmitted signal reflect from the objects and are received by the receive antenna 56.

The received RF signal is fed to the receiver circuit 54 for processing including down-converting and filtering and is subsequently fed to a Digital Signal Processor (DSP) 60. The DSP 60 processes the received signal by performing an FFT and uses the data resulting from the FFT to implement an algorithm with which at least a primary target within the FOV of the FLS 10 is detected and tracked. The detection and tracking algorithm is described generally in conjunction with the flow diagram of FIG. 10 and in the above-referenced and incorporated co-pending U.S. patent application Ser. No. 08/745,530.

Considering the FLS 10 in greater detail, the transmitter circuit 50 is responsive to a system clock signal generated by a frequency synthesizer 140 and coupled to the circuit 50 via signal line 62 and is further responsive to control signals 64a–64c provided by the DSP 60. The transmitter circuit 50 includes a Voltage Controlled Oscillator (VCO) 70. In the illustrative embodiment, the VCO 70 is provided by an Indium Phosphide (InP) Gunn-diode capable of generating a transmit signal 58 having a signal level of approximately +8 dBm at the transmit antenna 52. It will be appreciated by those of ordinary skill in the art that other types of VCOs may be suitable, including, for example, Monolithic Microwave Integrated Circuit (MMIC) oscillators using either hetero-junction bipolar transistor (HBT) or pseudomorphic high electron mobility transistor (PHEMT) technology.

In response to a VCO control signal 72 coupled thereto, VCO 70 provides the RF transmit signal 58, here having a frequency in the range of about 75.95 GHz to 76.25 GHz. The particular frequency of the RF transmit signal 58 is determined by the VCO control signal 72. Thus, by varying the voltage of the VCO control signal 72, the VCO 70 provides corresponding variations in the frequency of the RF signal 58.

Preferably, the transmitter circuit 50 operates as a Frequency Modulated Continuous Wave (FMCW) system. In an FMCW radar, the transmit signal 58 has a frequency which changes in a predetermined manner over time. With this arrangement, a measure of transit time of the RF signal can be determined by comparing the frequency of the received signal 120 with a sample of the frequency of the transmit signal 58. The range determination is provided by measuring the beat frequency between the frequencies of the transmit signal 58 and return signal 120. The frequency thus measured is equal to the slope of the transmit signal frequency ramp multiplied by the time delay of the return signal. Due to the constant velocity of electromagnetic radiation, the time delay is directly proportional to the range of the target or object off of which the return signal reflected. The measured frequency further contains the Doppler frequency due to the relative velocity between the target and the vehicle on which the FLS 10 is mounted. In order to separate and identify the two contributions to the measured frequency shift, the time-varying frequency of the transmit signal 58 is in the form of a linear ramp provided by a VCO control signal 72 having a characteristic shape as as shown in FIG. 3.

Figure 3:
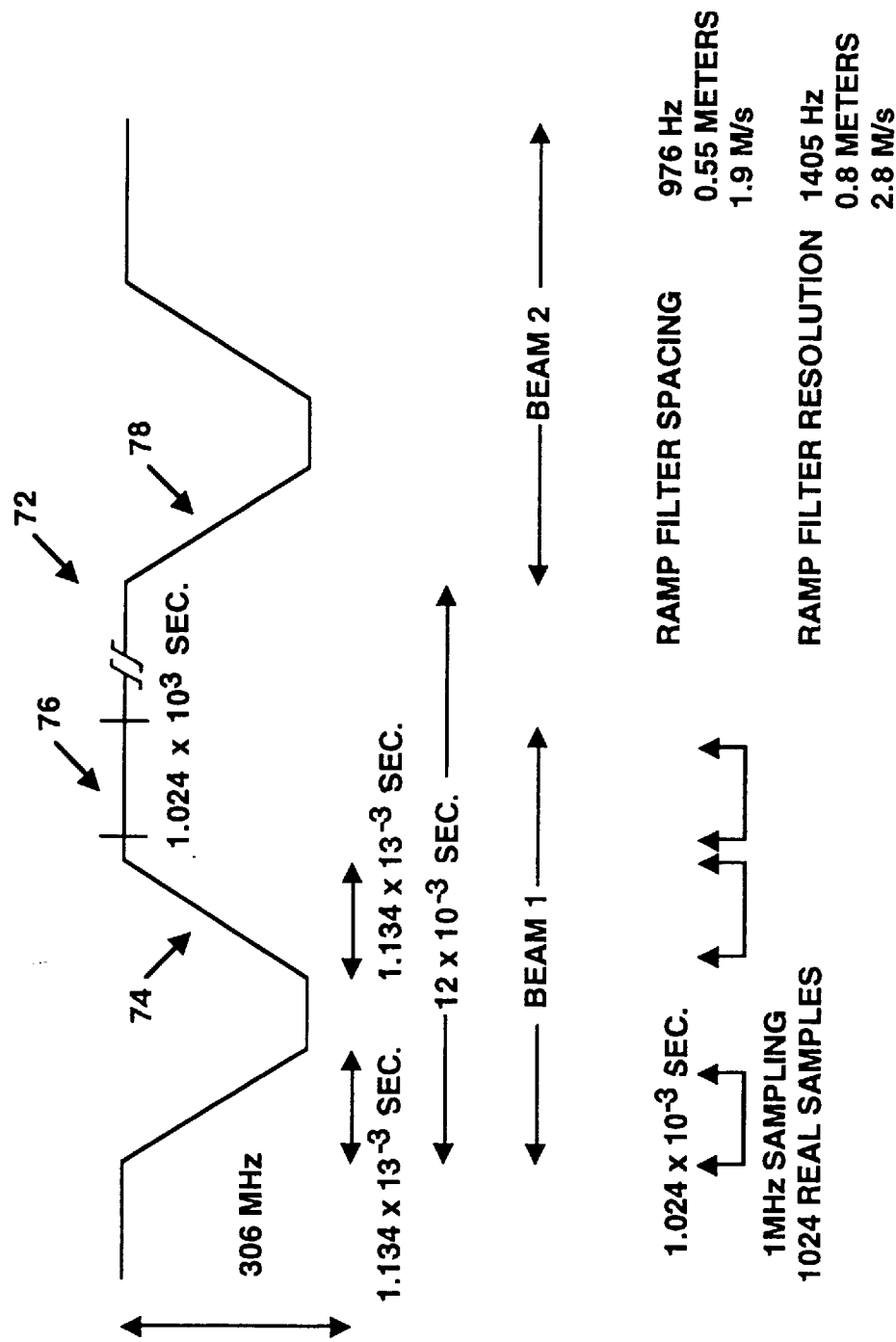
FIG. 3 shows the VCO control signal waveform.

Referring to FIG. 3, the VCO control signal 72 includes a ramp up portion 74, a continuous wave (CW) portion 76 and a ramp down portion 78. In the illustrative embodiment, the sampling intervals during the ramp up, CW and ramp down portions, 74, 76 and 78, respectively, are on the order of 1.024 milliseconds and are sampled at a 1 MHz rate to yield 1024 samples in each such interval. With Hanning weighing, this arrangement provides a range resolution of approximately 0.78 meters and a range rate resolution of approximately 2.8 meters/second. Assuming a minimum signal-to-noise ratio of 11 dB and the processing of two ramp pairs to track a target, range and range rate measurement accuracies are on the order of 0.11 meters and 0.39 meters/second, respectively. However, since signal-to-noise ratios for vehicular targets are typically in excess of 20 dB within the 100 meter operating range of the FLS 10, accuracies are on the order of 0.04 meters for range and 0.14 meters per second for range rate.

For proper operation of the FLS 10 and, in particular, to prevent smear of the frequency of the received RF signal 120, it is important that the VCO control signal 72 have substantially linear ramp up and ramp down portions 74, 78, respectively. To this end, and referring again to FIG. 2, a linearization circuit 80 is provided for ensuring that the VCO control signal 72 ramps up and down in a linear fashion, as will be described further below.

A portion of the RF transmit signal 58 is fed back, via a coupler 82 to an input port of a mixer 84. A second input port of the mixer 84 receives a local oscillator signal generated by a Dielectric Resonator Oscillator (DRO) 86. The mixer 84 operates as a down-converter to generate an intermediate frequency (IF) signal at its output port having a frequency on the order of between 350 MHz and 659 MHz. The IF signal is coupled to an amplifier 90, the output signal of which provides an input signal to the linearization circuit 80 via signal line 92, as shown.

The linearization circuit 80 includes a divider element 94 operative to divide the 50 MHz clock signal 62 by a value of ninety-six to provide an output signal 98 having a nominal frequency of 520.8 KHz for coupling to an input port of a mixer 96. The signal 98 is further coupled to a counter 100 of the transmitter circuit 50.

Counter 100 is responsive to control signals 64a–64c from the DSP 60 and to the 520.8 KHz input signal 98 for counting up or down or latching its present count value to provide a signal 102 having a digital value between 673 and 1265, such value representing a value N. The value N signal 102 is coupled to a divider element 104 which divides the frequency of input signal 92 by the value N to generate a signal 106 for coupling to a second input port of the mixer 96.

The linearization circuit 80 is operative to provide an output signal 108 phase-locked to the input signal 92. This is achieved by comparing the divided output frequency signal 106 of the millimeter wave VCO 272 with a fixed reference frequency signal 98. The divided output frequency signal 106 of the VCO is combined with the fixed reference frequency signal 98 in a phase/frequency detector which provides an error voltage 108 proportional to phase and frequency errors between the fixed reference frequency signal 98 and the divided output frequency signal 106. The error voltage 108 is filtered by a loop filter 110 to provide the VCO control signal 72 which is fed back to the VCO 70 to tune it such that the divided output frequency signal 106 is equal to the fixed reference frequency signal 98. By making the divider 104 programmable and incrementing the divisor by a fixed amount at a fixed rate (set by the system's crystal clock), the VCO 70 through the feedback loop changes its frequency in a linear manner (i.e., df/dt is constant). The VCO control signal 72 (referred to alternatively as the chirp signal) is inherently linear since each frequency step and each time step are the same throughout the duration of the chirp.

With the linearization circuit 80, the VCO control signal 72 changes frequency in response to changes in the value N signal 102. In particular, once the value N signal 102 changes, the VCO control signal 72 approaches a new frequency in an exponential fashion, with the exact wave shape depending on various loop parameters. The size of the frequency step and time step with which the VCO control signal 72 approaches the new frequency are selected in order to meet a predetermined VCO control signal (i.e., chirp signal) slope requirement. In the illustrative embodiment, the chirp slope is approximately 270 KHz/$\mu$sec, which corresponds to a time step of 1.9245 microseconds. The chirp slope is selected in accordance with a variety of factors including but not limited to the processing speed, sampling speed, resolution and dynamic range of the analog-to-digital converters utilized in DSP 60 as well as the number of points included in a Fast Fourier Transform (FFT) computation performed via DSP 60. In this particular embodiment, a Nyquist sampling rate of 1 MHz and a 1024 point FFT is used.

Since the frequency step and time step with which the VCO control signal 72 approaches a new frequency are maintained at a constant value, the ramp up and ramp down portion, 74, 78 of the VCO control signal 72 are inherently substantially linear. In the illustrative embodiment, the linearity of the VCO control signal 72 is on the order of approximately 0.04%, which corresponds to a frequency variation in the received RF signal 120 of less than approximately 100 Hz. While certain loop parameters which are a function of the value N may affect the linearity of the VCO control signal 72, these parameters can be compensated by adjusting the loop gain as a function of the value N. The loop gain is compensated by adjusting the compensation circuitry of the loop filter 110.

It will be appreciated by those of ordinary skill in the art that other circuit implementations which cause the frequency and time step with which the VCO control signal 72 approaches a new frequency to be maintained substantially constant can be used to ensure substantial linearity of the VCO control signal 72. One such alternative circuit is shown and described in conjunction with FIG. 4, below.

Although not pictorially illustrated as such in FIG. 2, in the illustrative embodiment, the alignment beams 66a, 66m of the receive antenna beams 66 and the alignment beams 68a, 68m of the transmit antenna beams 68 are aimed at approximately 20° in opposite directions from the nominal center line of the respective vehicle (and the antenna if the antenna is physically placed along the vehicle center line) and, further, are angled down toward the road surface at approximately 45°.

With this particular technique, alignment measurements taken when vehicle velocity is between 40 and 80 mph results in a maximum error on the order of 0.127°. Because the reliability of the present alignment scheme is a function of signal-to-noise ratio, in order to maximize signal returns in the receive antenna alignment beams 66a, 66m, vertical polarization is preferably used. The alignment scheme employs antenna beams having a relatively narrow beamwidth. With the antenna beams pointed as such, the sensing system senses differences in Doppler returns resulting from sensor misalignment. For example, with the alignment antenna beams 66a, 66m, 68a, 68m properly aligned and pointed at substantially mirror image edges of a road, substantially identical Doppler returns should be received and detected by the sensing system. If the antenna beams 66a, 66m, 68a, 68m are not properly aligned, however, then different Doppler returns should be received and detected by the sensing system thus indicating improper alignment of the FLS 10 relative to the vehicle 40.

Figure 4:
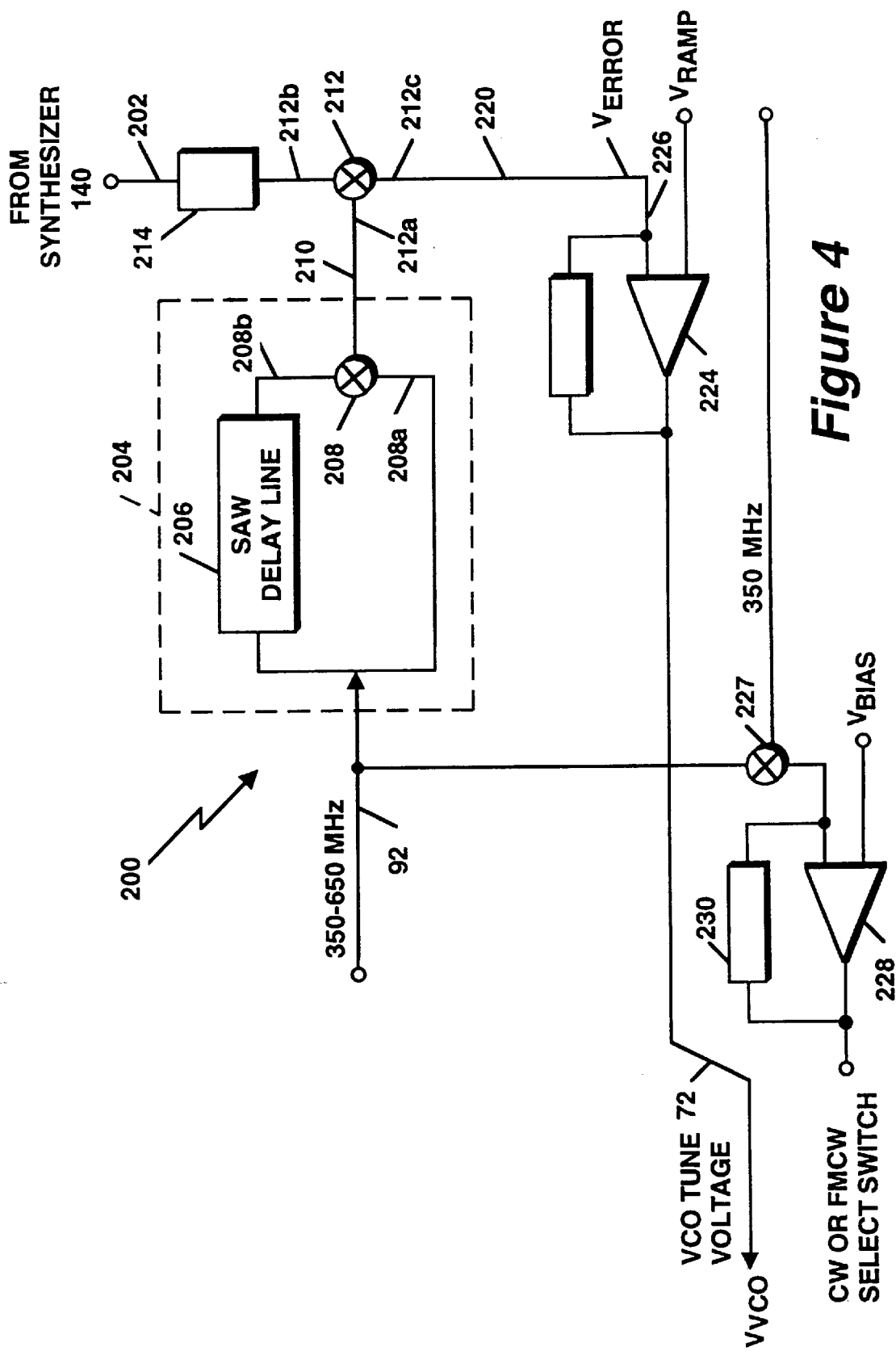
FIG. 4 is a block diagram of an alternative linearization circuit for use with the FLS of FIG. 2.

Referring to FIG. 4, as illustrated by circuit 200, portions of transmitter 50 (FIG. 2) may be implemented with analog circuitry and techniques, to provide the VCO control signal 72 (FIGS. 2, 3) with substantially linear ramp up and ramp down portions. The circuit 200 is responsive to the VCO feedback signal 92 (FIG. 2) and to a fixed reference frequency signal 202 generated by the synthesizer 140 (FIG. 2). In the illustrative embodiment, the fixed reference frequency signal 202 has a nominal frequency of about 400 KHz. The feedback signal 92 is coupled to a Surface Acoustic Wave (SAW) interferometer 204, including a SAW delay line 206 and a mixer 208 arranged and coupled as shown. Feedback signal 92 is fed to an input port of the SAW delay line 206 and to a first input port 208a of mixer 208. The SAW delay line feeds a phase shifted signal to a second input port 208b of mixer 208. The mixer 208 detects phase differences between the two signals fed to the ports 208a, 208b, respectively. The mixer 208 provides at an output port 208c (corresponding to the output port of the interferometer 204) an interferometer output signal 210 having a frequency proportional to the slope of the VCO control signal 72. The signal 210 is coupled to an input 212a of a mixer 212.

The fixed reference frequency signal 202 is fed from the synthesizer 140 to an input of a phase switch 214, the output of which is coupled to a second input 212b of the mixer 212, as shown. The phase switch 214 is placed in a first switch position when the frequency of the signal provided by the VCO 70 (FIG. 2) is increasing with respect to time as shown in waveform portion 74 (FIG. 3) to thus introduce a first phase shift into the signal fed to mixer port 212b. When the frequency of the signal provided by the VCO 70 is decreasing with respect to time as shown in waveform portion 78 (FIG. 3), however, the phase switch 214 is placed in a second switch position to thus introduce a second phase shift into the signal fed to mixer port 212b.

The interferometer output signal 210 is a difference signal which determines the amount by which the VCO tuning voltage 72 ($V_{VCO}$) must be adjusted to provide the VCO output signal having a particular frequency. The signal fed from the phase switch 214 to the mixer input port 212b determines the direction in which the VCO tuning voltage 72 $V_{VCO}$ must change (i.e. whether the magnitude of the tuning voltage $V_{VCO}$ should increase or decrease). Phase switch 214 is thus in one of two switch positions depending upon whether the VCO signal waveform has a positive slope or a negative slope. With this approach, the phase lock loop maintains phase lock during slope transition periods of the VCO tuning voltage signal 72.

The mixer 212 compares the fixed reference frequency signal 202 with the interferometer signal 210 having a frequency determined by the slope of the VCO control signal 72 to generate an error signal 220 at an output port thereof. The error signal 220 is coupled to a first input of an amplifier 224. A linear voltage ramp 226 is coupled to a second input of amplifier 224. The output of the amplifier 224 provides the VCO control signal 72 for tuning the VCO 70.

The mixer 227 provides an output error voltage 231 which is added in amplifier 228 to a fixed bias voltage 232 to produce a tuning voltage 233 when the VCO 70 (FIG. 2) is commanded to the CW mode of operation to thus synchronize the VCO 70 at the low-frequency end of the VCO frequency tuning range to a signal having a frequency derived from a relatively frequency stable crystal oscillator. This minimizes changes in signal frequency generally referred to as "frequency drift" which can arise due to changes in environmental conditions, such as thermal changes for example, which affect the operating characteristics of the VCO 70.

Mixer 227, amplifier 228 and feedback signal path 230 provide a continuous wave (CW) or frequency-modulated continuous wave (FMCW) selection signal. When the selection signal has a first value VCO 70 (FIG. 2) provides an FMCW signal and when the selection signal has a second value VCO 70 provides a CW signal.

Referring again to FIG. 2, the receive path of the FLS 10 including receive antenna 56 and receiver circuit 54 is here adapted to receive continuous wave (CW) signals. In the illustrative embodiment, the receiver circuit 54 is provided as a chopped homodyne receiver. As will become apparent, this particular receiver circuit 54 advantageously shifts the received RF signal 120 out beyond the 1/f noise region of the receiver circuit 54 and in particular, of a down-converter 146 associated therewith. A further advantageous feature of the receiver circuit 154 in achieving a low noise figure on the order of about 6 decibels (dBs) is the use of a Low Noise Amplifier (LNA) 122 ahead of the down-converter 146, as will be described.

The receive antenna 56 couples a received RF signal 120 to the receiver circuit 54. In particular, the received signal 120 is coupled to an LNA 122 which provides an amplified output signal 124 to a Single-Sideband Generator (SSBG) 126. The LNA 122 and SSBG 126 are operative to significantly reduce total noise associated with the received RF signal 120. As will become apparent, use of these particular circuits enables reliable and accurate operation of the FLS 10 in detecting targets within the FOV of the FLS 10.

The SSBG 126 includes a power divider 128 to which the amplified signal 124 is coupled. The divider 128 divides the signal 124 into two signals having equal power and phase for coupling to amplifiers 132 and 134, as shown. Amplifiers 132 and 134 receive respective in phase and quadrature (I/Q) signals from the frequency synthesizer 140. The I and Q signals have a nominal frequency on the order of 6.25 MHz and are 90° out of phase relative to one another. Thus, the output signals 136, 138 of amplifiers 132, 134, respectively, are 90° out of phase relative to one another.

The amplifier output signals 136, 138 are coupled to input ports of a quadrature coupler 142 having a first terminated output port and a second output port coupled to a down-converting mixer 146 via a signal line 144. The quadrature coupler 142 subtracts the input signals thereto to provide a first output signal at the first output port and adds the input signals to provide a second output signal at the second output port for coupling to the down-converting mixer 146.

A portion of the transmit signal 58 is coupled from VCO 70 via coupler 82 through a signal path 148 to provide a local oscillator (LO) signal at the LO input port of the down-converting mixer 146. Mixer 146 provides an Intermediate Frequency (IF) signal 150 at an output port thereof for further processing.

The IF signal 150 is coupled to further receiver circuitry, including an amplifier 152, an amplitude attenuation element 154, a buffer 156, an IF mixer 158, a buffer 160 and a filter 162, all coupled in series, as shown. The amplitude attenuator 154 is responsive to a control signal 164 from the DSP 60 and permits adjustment of the IF signal level in order to prevent saturation of an analog-to-digital (A/D) converter 166. The IF mixer 158 is responsive to the processed received signal and to an oscillator signal provided by the synthesizer 140 which, here, has a nominal frequency of 6.25 MHz, for further down-converting of the IF signal to frequencies appropriate for processing by the A/D converter 166, here to frequencies on the order of 250 kHz.

The output signal 168 of filter 162 is coupled to the A/D converter 166 associated with the DSP 60. As noted above, the process implemented by the DSP 60 in response to received RF signals to detect and track a primary target in the field of view of the FLS 10 is described in conjunction with the flow diagram of FIG. 10 and in the above-referenced and incorporated U.S. patent application Ser. No. 08/745,530. Suffice it to say that the DSP 60 provides to a vehicle interface output signals 170 which characterize the primary target, for example, in terms of its range, range rate and/or angle relative to the vehicle on which the FLS 10 is mounted. A power supply 172 of the FLS 10 may be powered by the battery of the vehicle on which the FLS is mounted.

Preferably, the LNA 122 and the SSBG 126 are implemented as one or more Monolithic Microwave Integrated Circuits (MMIC). However, it will be apparent to those of ordinary skill in the art that various manufacturing techniques, including so-called chip and wire techniques and other arrangements, are suitable for providing components of the FLS 10.

Alignment of the FLS 10 relative to the vehicle 40 to which it is mounted is achieved with the use of two beams 68a, 68b of the transmit antenna beams 68 and two beams 66a, 66m of the receive antenna beams 66. In general overview, the transmit antenna beams 68a, 68m transmit a predetermined RF alignment signal. Reflections from the transmitted RF signal are received by the receive antenna beams 66a, 66m and are processed to determine the alignment of the FLS 10 relative to the motion of the vehicle. This alignment process is repeated each time the vehicle is placed in motion and the results are used by the DSP 60 during operation in processing RF signal reflections in order to compensate for variations in alignment detecting and tracking targets within the FLS field of view.

Figure 5:
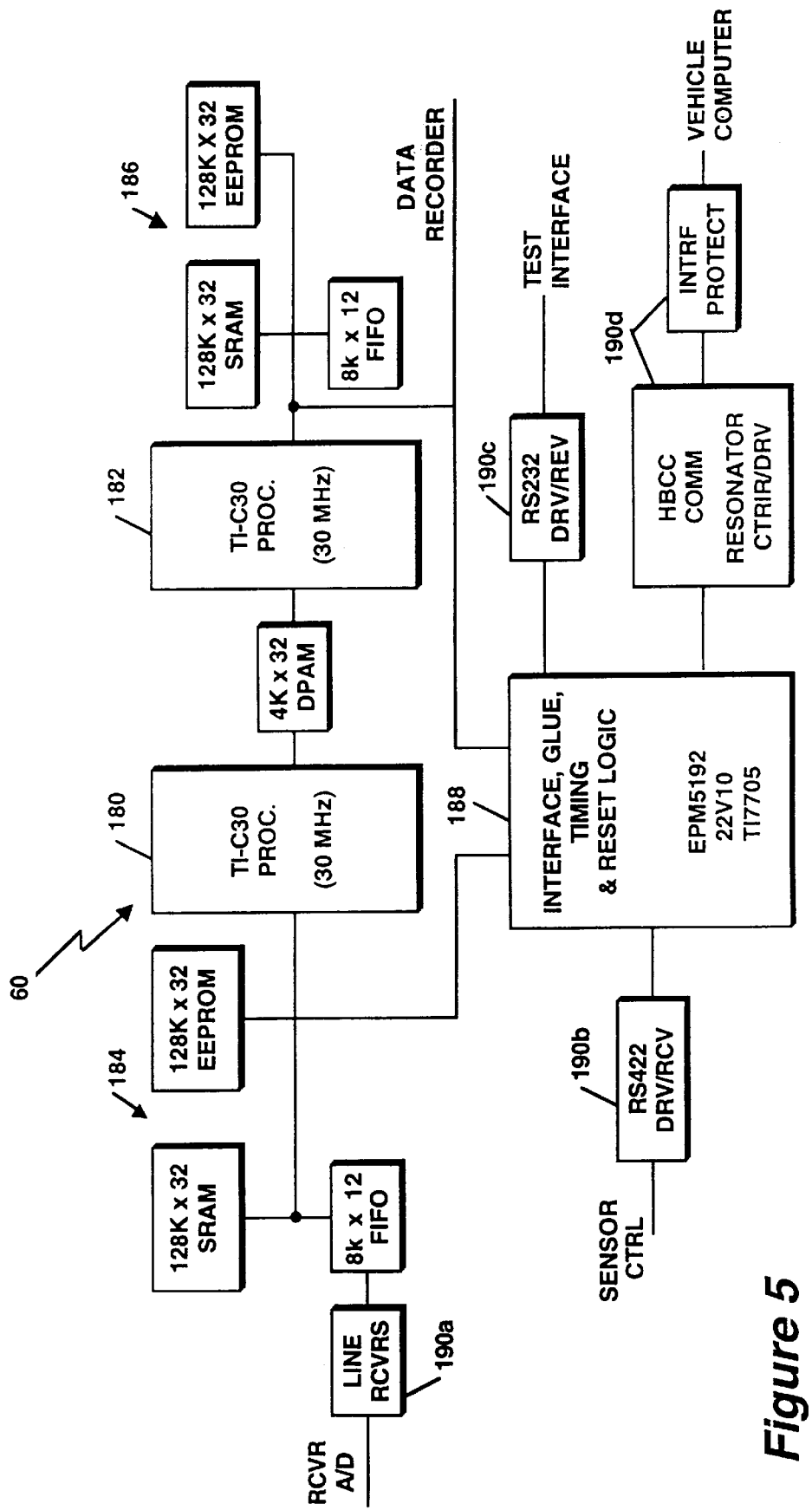
FIG. 5 is a block diagram of the Digital Signal Processor (DSP) of FIG. 2.

Referring also to the block diagram of FIG. 5, one suitable architecture for the DSP 60 is shown. The DSP 60 includes signal processor circuits 180, 182, each having associated memory components 184, 186, respectively, including at least one First In First Out (FIFO) element, static random access memory (SRAM) element and electrically erasable programmable read-only memory (EEPROM) element. In the illustrative embodiment, processing circuit 180 is dedicated to processing received RF signals 120 (FIG. 2) and processing circuit 182 is dedicated to data recording and display functions. A dynamic random access memory (DRAM) 187 is coupled between processors 180, 182 and ensures that processors 180, 182 each have access to information which must be shared between processors 180, 182.

Additional components of the DSP 60 include a timing circuit 188, interface circuits 190a–190d for interfacing with various elements of the FLS 10 and vehicle on which the FLS is mounted. In particular, line receiver circuit 190a is coupled to the A/D converter 166 (FIG. 2), driver/receiver circuit 190b is coupled at a first port to the vehicle computer at a first port receives and provides sensor control commands thereto. Such commands determine the sensor mode of operation (e.g. standby mode vs. active mode, etc. . . . ). A second port of driver/receiver Circuit 190b is coupled to timing circuit 188. A driver/receiver circuit 190c is coupled to an optional test interface used to provide a convenient means of testing DSP 60. Protection circuit 190d is coupled to the longitudinal control unit of the vehicle on which the FLS 10 is mounted.

In the illustrative embodiment, the DSP 60 is implemented on a printed wiring board located in spaced relationship from other components, and in particular, from the antenna 52, 56, of the FLS 10. It will be appreciated by those of ordinary skill in the art, however, that various components, architectures and implementations of the DSP 60 are possible, including the use of only a single processor circuit as may be implemented on a surface-mount printed wiring board within the same housing as the other components of the FLS 10. In the illustrative embodiment, the processing circuits 180, 182 are of the type sold by Texas Instruments under product No. TMS320C30.

Figure 6:
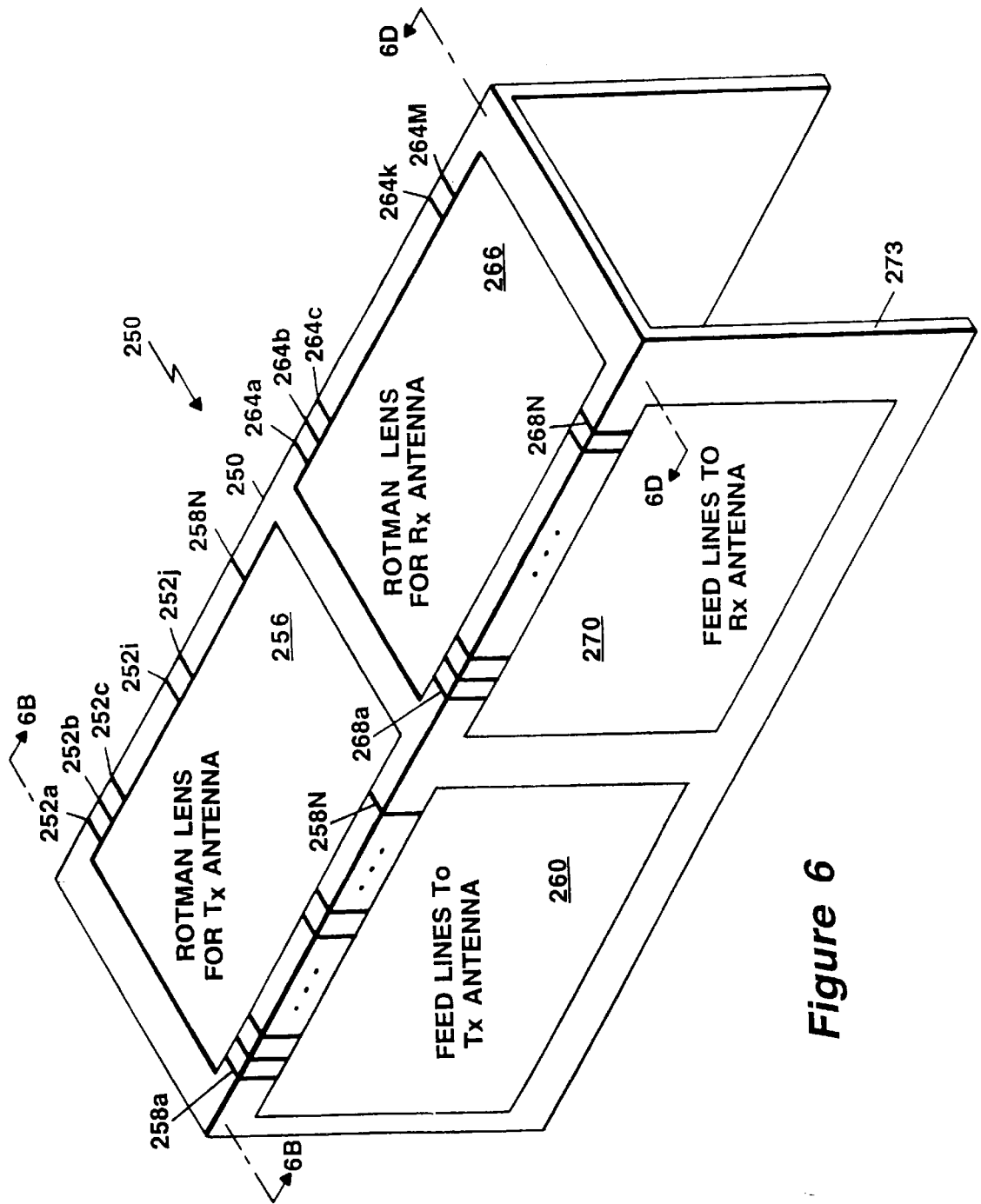
FIG. 6 is an isometric view of a preferred embodiment for the FLS housing, including the transmit lens, the transmit antenna, the receive lens and the receive antenna.
Figure 6A:
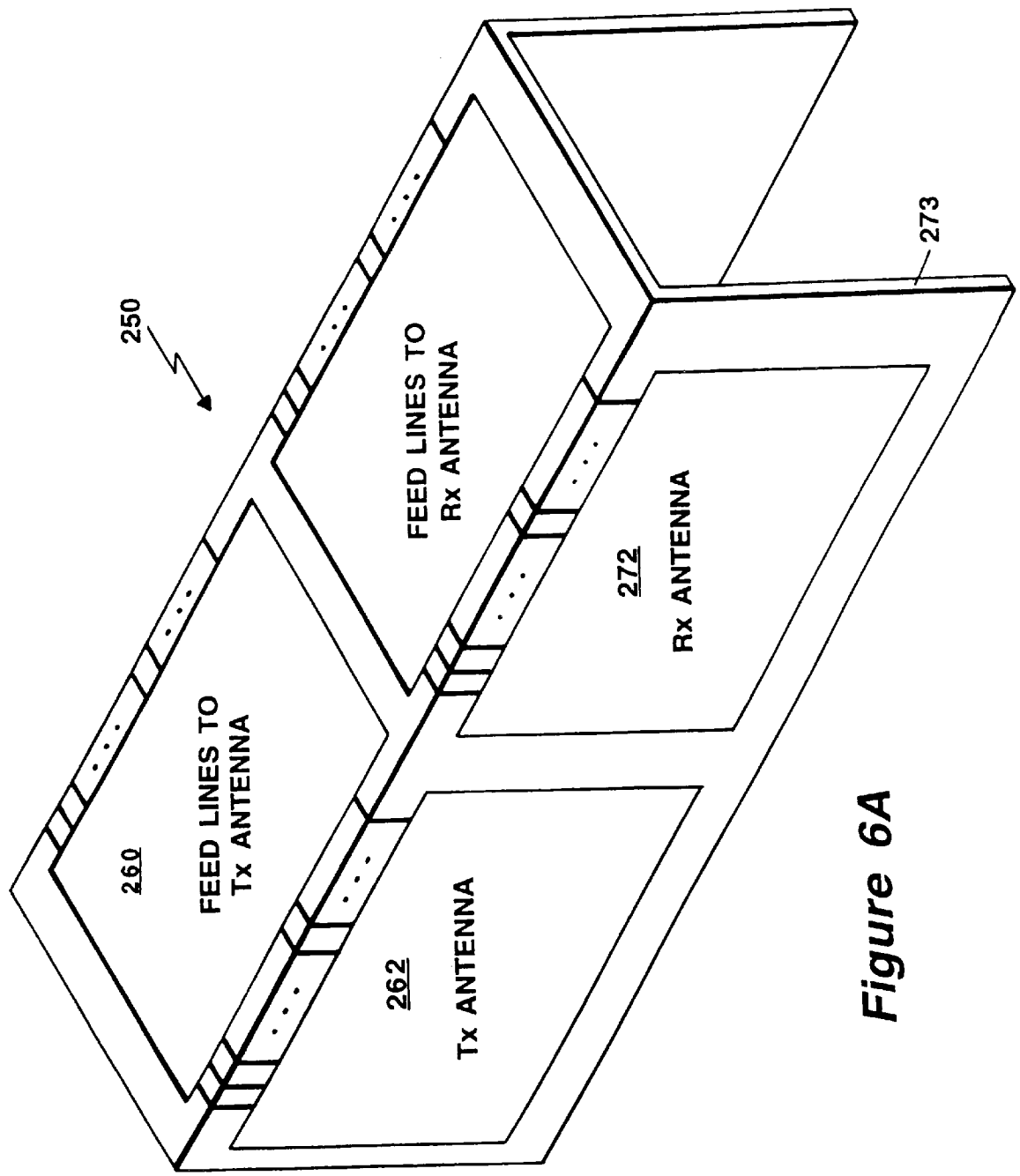
FIG. 6A is an isometric view showing the FLS housing of FIG. 6 rotated 90° relative to the view of FIG. 6.
Figure 6C:
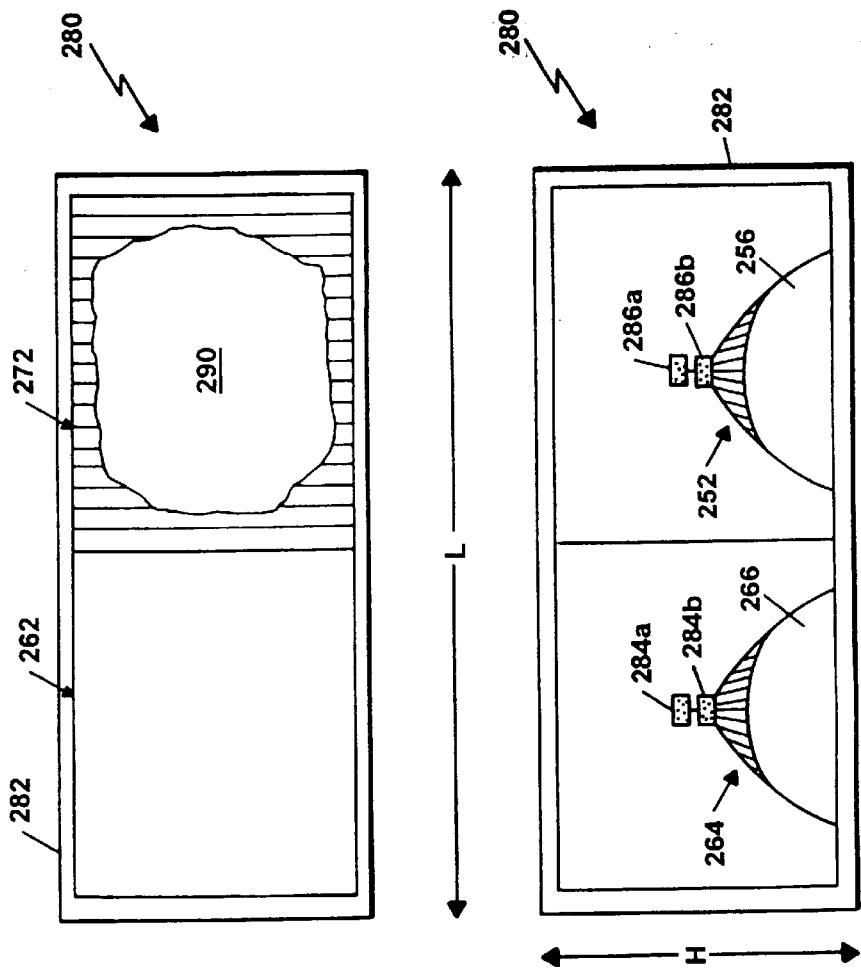
FIG. 6C is a plan view of the FLS housing of FIG. 6B taken along line 6C—6C of FIG. 6B.
Figure 6E:
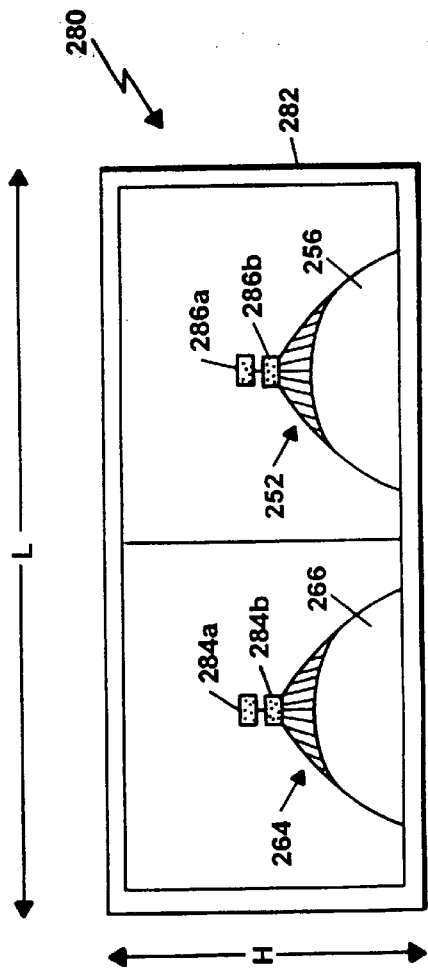
FIG. 6E is a plan view of the FLS housing of FIG. 6D taken along line 6E—6E of FIG. 6D.

Referring to FIGS. 6–6E in which like elements are provided having like reference numerals throughout the several views, an antenna assembly 250 has a plurality of transmit antenna input ports 252a–252N coupled to the input ports of a Rotman lens 256. The Rotman lens 256 receives RF signals from one or more of the input ports 252 and provides RF signals having predetermined amplitude and phase relationships at output ports 258a–258N. The phase and amplitude adjusted RF signals are fed via respective ones of transmit signal path feed lines 260a–260N to a transmit antenna 262 (FIG. 6A) and in particular to corresponding ones of a plurality of transmit antenna elements 265 (FIG. 6A).

Antenna assembly 250 also has a plurality of receive antenna output ports 264a–264N coupled to the input ports of a second Rotman lens 266. Rotman lens 266 receives RF signals at one or more input ports 268a–268N. The RF signals are fed to the Rotman lens input ports 268 via a series of RF feed lines 270a–270N which couple a transmit antenna 272 (FIG. 6A) and in particular to corresponding ones of a plurality of receive antenna elements 269 (FIG. 6A) to the Rotman lens 266.

Thus, antenna assembly 250 includes a transmit antenna 262 and associated feed circuitry and a receive antenna 272 and associated feed circuitry. The transmit and receive antennas 262, 272 are preferably provided as printed circuit antennas such as the type described in co-pending patent application filed on Nov. 21, 1995, assigned application Ser. No. 08/561,513, entitled ANTENNA and assigned to the assignee of the present invention and incorporated in its entirety herein by reference. The transmit and receive antennas 262, 272 are preferably printed on a dielectric substrate 273 which is coupled to a housing 282 (FIG. 6D) which may be provided, for example, from aluminum or any other material having sufficient strength to support the dielectric material on which the antenna is printed.

Figure 6B:
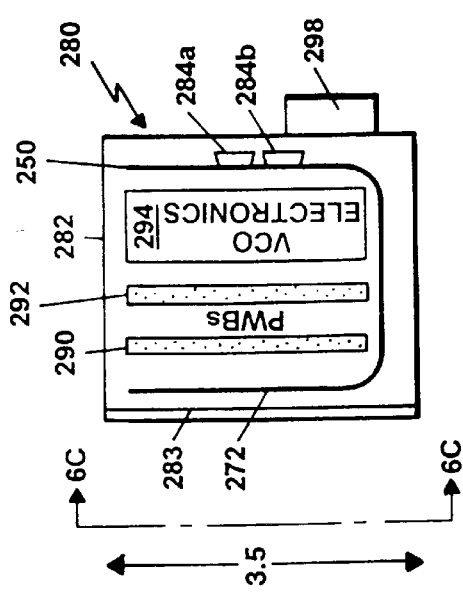
FIG. 6B is a cross-sectional view of the FLS housing of FIG. 6 taken along line 6B—6B of FIG. 6.
Figure 6D:
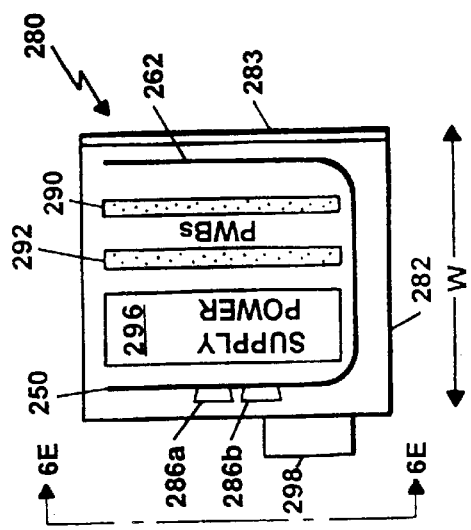
FIG. 6D is a cross-sectional view of the FLS housing of FIG. 6 taken along line 6D—6D of FIG. 6.

Referring to FIGS. 6B and 6D, an FLS assembly 250 having a length L, a width W and a height H, includes a mounting structure 282 having transmit and receive antennas 262, 272 and associated feed circuitry coupled thereto. In one particular embodiment, the FLS 280 has a width W of about 4 inches, a height H of about 3.5 inches and a length L of about 8.8 inches. A radome 283 is disposed over transmit and receive antennas 262, 272. As discussed above, the transmit and receive feed circuits may be provided from a series of feed lines 252, 264 coupled to respective ones of Rotman lenses 256, 266.

First ends of feed lines 264 are coupled to Rotman lens 266 and second ends of feed lines 264 are coupled to a single pole multi-throw switch 284b. The switch 284b couples selected ones of the plurality of feed lines 264 to a voltage controlled oscillator (VCO) 284a. In a preferred embodiment, the VCO 284 and the switch 284b are implemented as monolithic microwave integrated circuits (MMICs).

Similarly, first ends of feed lines 252 are coupled to Rotman lens 256 and second ends of feed lines 252 are coupled through a single-pole-multi-throw switch 286b to a receiver circuit 286a. In a preferred embodiment, the switch 286b and the receiver circuit 286a are provided as MMICs. The single pole multi-throw switches 284b, 286b are used to select particular ones of the Rotman lens feed points to thus direct respective transmit and antenna beams in a particular, desired direction.

In this particular embodiment, the printed circuit antenna and feed circuit assemblies are fabricated or otherwise formed having a U-shape as shown, and coupled to the mounting structure 282. Also coupled to mounting structure 282 are one or more printed wiring boards 290, 292, on which are disposed control circuits, linearization circuits and other circuits as discussed above in conjunction with FIGS. 2–5. VCO electronics 294, and a power supply 296 are also coupled to the mounting structure 282 as shown to thus provide a compact, bi-static dual-feed antenna assembly 250 and FLS 280. The FLS assembly can be physically and electrically coupled to a vehicle through an input/output connector 298.

Referring to FIG. 6C, portions of radome 283 and antenna 272 have here been removed to reveal a first surface of the printed wiring board 290 on which the above mentioned control, linearization and other circuitry may be disposed.

Figure 7:
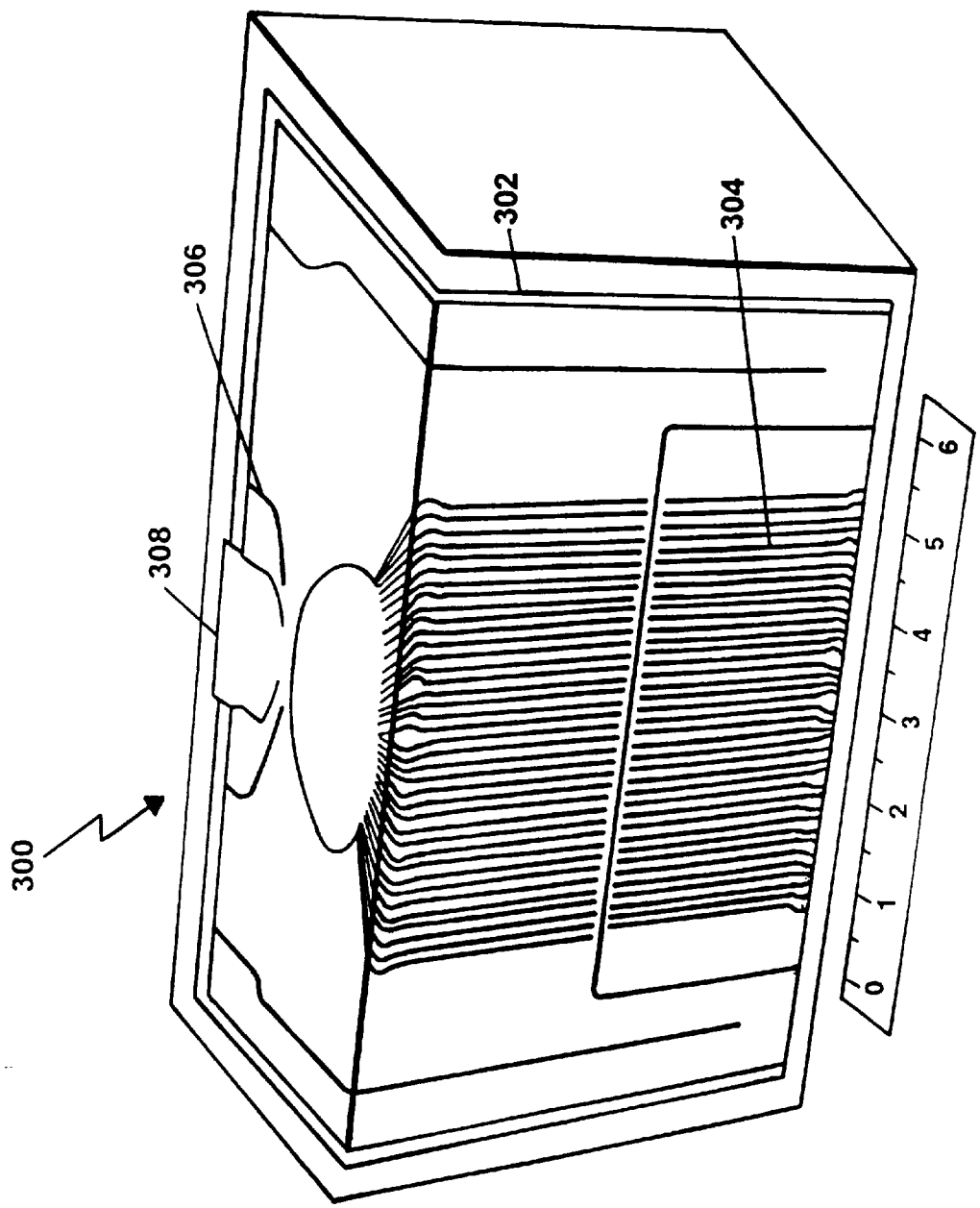
FIG. 7 illustrates an alternate embodiment of the FLS housing.

Referring to FIG. 7, an alternate embodiment of a bi-static dual-feed antenna assembly 300 includes transmit and receive antennas 302, 304, a Rotman lens 306 and associated feed circuitry 308 coupled to receive antenna 302. Antenna assembly 300 also includes a second Rotman lens and associated feed circuit (not visible in this view). In this embodiment, the receive and transmit antennas 302, 304 are disposed end-to-end rather than side-by-side as shown in antenna assembly 250 (FIG. 6).

Figure 8:
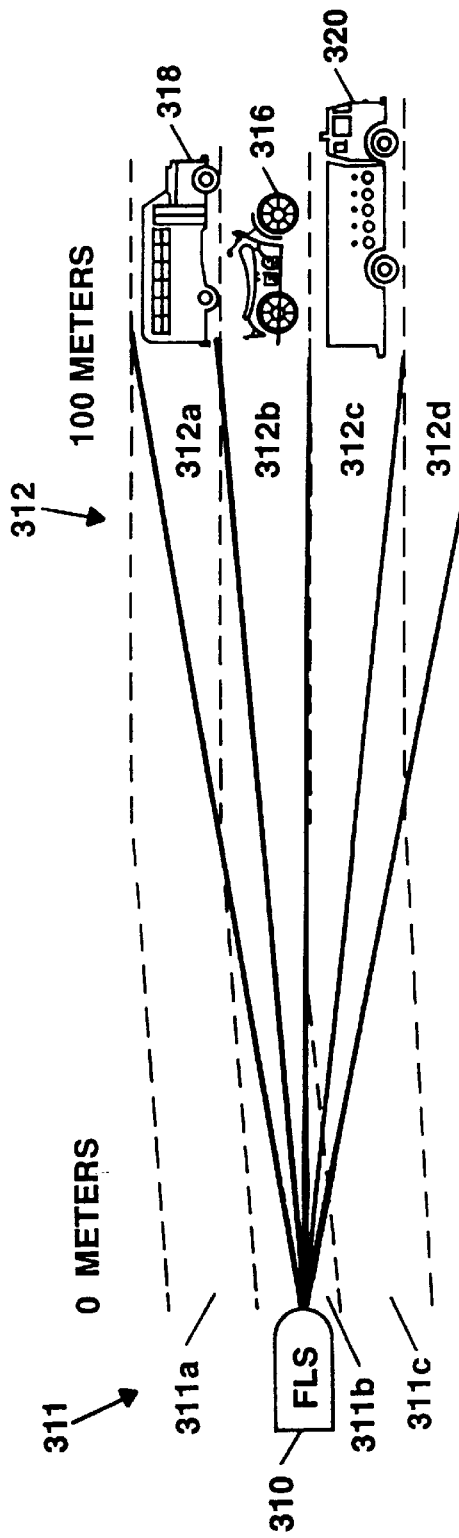
FIGS. 8, 8A and 8B illustrate different beam spacings of the receive antenna of FIG. 2.
Figure 8A:
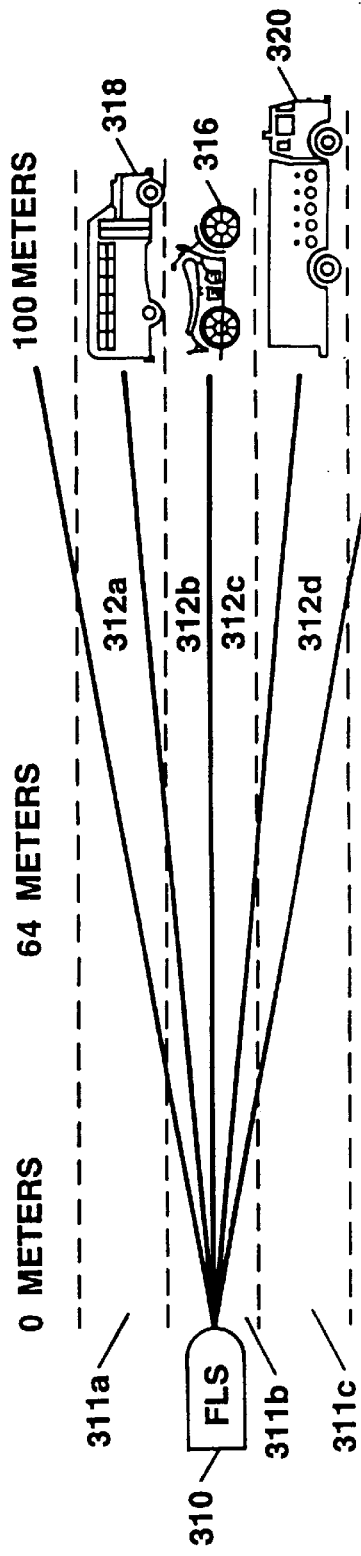

Referring now to FIGS. 8 and 8A, an FLS 310 includes an antenna assembly which radiates multiple, here four, major radiation lobes or antenna "beams" 312a–312d generally denoted 312. Each of the multiple beams 312 have a spatial position such that the antenna beams 312a–312d intercept each other at points in the antenna radiation patterns corresponding to the half-power beamwidth of each antenna beam. With this technique, a processing procedure utilized by the FLS determines angular location of the target by determining if the target appears in one beam (e.g. one of beams 312a–312c) or equally in two adjacent beams (e.g. in both beam 312a and 312b). Each of the beams 312a–312d has a half-power beamwidth corresponding to about 2.2 spatial degrees. Thus, the FLS 310 has a field of view of about 8.8 spatial degrees.

This approach allows reliable resolution of the closest object of interest in the lane occupied by FLS 310 up to a distance of about 64 meters. For reasons which will be explained below, however, beyond a distance of 64 meters, the FLS is unable to reliably resolve adjacent-lane objects. The limitation and the ability of the FLS 310 to reliably resolve adjacent-lane objects in a range beyond 64 meters is due to the spacing of the antenna beams 312a–312d.

FIG. 8 illustrates a condition in which a vehicle in which FLS 310 is mounted is travelling on a road having three lanes 311a, 311b, 311c generally denoted 311. The FLS 310 travels in the center lane 311b. Antenna beam 312b intercepts a motorcycle 316 also travelling in the center lane 311b (and thus referred to as an "in-path" vehicle). A second vehicle 318 travelling in lane 311a adjacent one side of the motorcycle 316 is detected by antenna beam 312a and a third vehicle 320 travelling in lane 311c adjacent another side of the motorcycle 316 is detected by antenna beam 312c. Since the motorcycle 316 and vehicles 318, 320 appear in three separate beams 312a, 312b, 312c, the motorcycle 316 and vehicles 318, 320 can be correctly resolved as separate and distinct objects to a distance of about 100 meters. Beyond distances of 100 meters, however, the antenna beams 312 have a half-power beamwidth which is greater than the width of a single travel lane 311. Thus it is not possible to simply track vehicles via separate antenna beams.

Referring to FIG. 8A, due to a change of heading of the FLS 310 relative to vehicles 316, 318, 320, antenna beams 312a–312d intercept vehicles 316, 318, 320 at an angle different from that shown in FIG. 8A. Thus, all three vehicles 316, 318, 320 now appear in each of two adjacent beams. For example, the motorcycle 316 appears in antenna beams 312b, 312c; the vehicle 318 appears in beams 312a, 312b; and the vehicle 320 appears in beams 312c, 312d. Because vehicle 318 appears in beam 312b and vehicle 320 appears in beam 312c, the reflected energy received by FLS 310 in beams 312b, 312c appears to originate from an in-path vehicle i.e., a vehicle travelling in the same lane as the FLS 310. This condition results in the FLS 310 likely determining that a vehicle or object is in the lane of the FLS vehicle regardless of whether the motorcycle 316 or other in-path object were present or not.

At ranges less than 64 meters, the half-power beamwidth of the FLS antenna is such that two adjacent beams do not exceed a lane width and can, therefore, unambiguously resolve the in-path vehicle. That is, as shown in FIG. 8A, any vehicle in lane 311a appears only in beam 312a and any vehicle in lane 311c appears only in beam 312d. Thus, only an in-path vehicle will produce a return in both antenna beams 312b and 312c.

In a preferred embodiment, transmit and receive antennas 262, 272 discussed above in conjunction with FIG. 6A, also have a half-power beamwidth of about 2.2°. Transmit and receive antennas 262, 272, however, have the beams spaced by an amount corresponding to about one-half of the one-half power beamwidth as apposed to an amount corresponding to the entire half-power beamwidth.

Figure 8B:
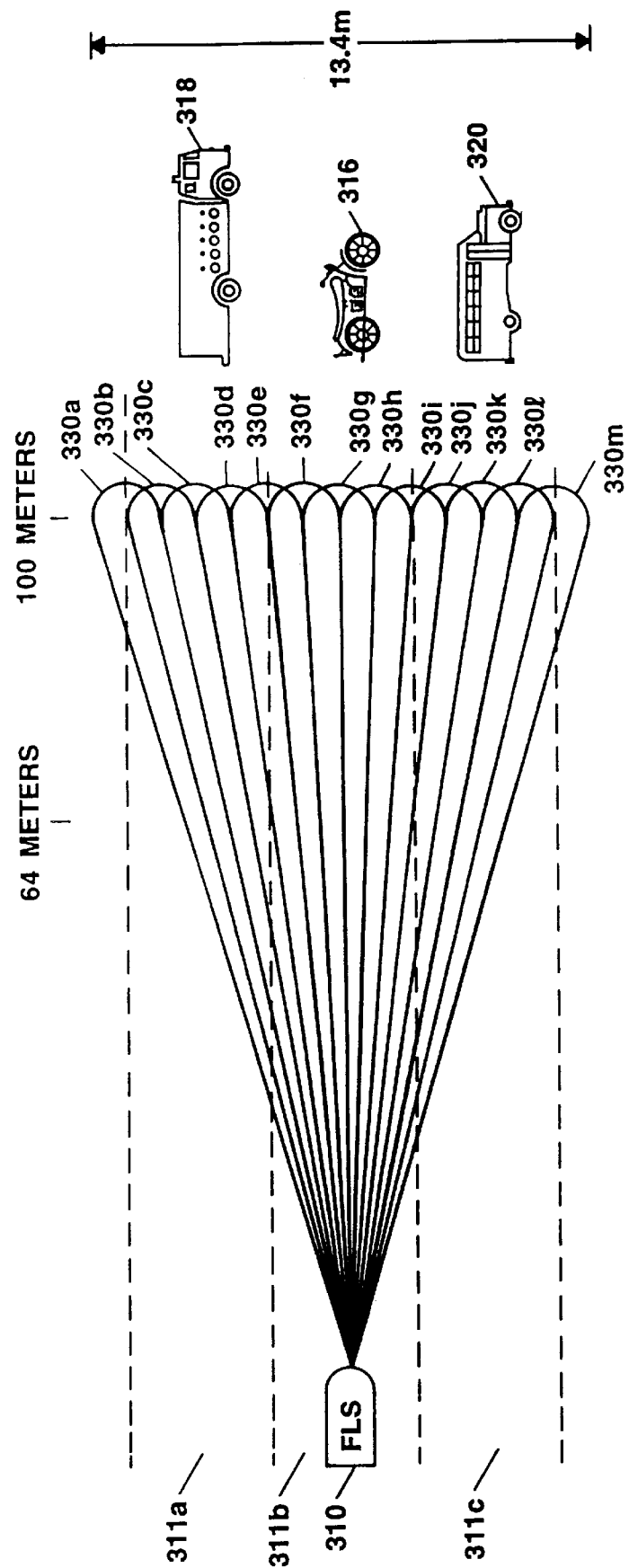

Referring to FIG. 8B, FLS 310 is shown having an antenna system which provides thirteen separate radiation beams 330a–330m each spaced by about one-half of the one-half power beamwidth. In this case where the one-half power beamwidth corresponds to about 2.2°, the beams overlap by about 1.1°. The antenna field of view thus corresponds to about 15.4° with each beam crossing the neighboring beams at a point which is about 1 decibel (dB) below the peak antenna beam power point.

With this approach, two adjacent lane vehicles will not appear in the same beams as an in-path vehicle. Thus, ambiguities, such as the ambiguity described above in conjunction with FIG. 8A, can be resolved at distances in the range of about 100 meters.

With 13 beams, a vehicle in each lane appears in multiple beams. For example, beams 330b, 330c and 330d intercept vehicle 318 in lane 311a while beams 330f, 330g and 330h intercept vehicle 316 in lane 311b and beams 330j, 330k, and 330l intercept vehicle 320 in lane 311c. It should be noted that the above is true for vehicles which are about 100 meters from FLS 310 as shown. A different combination of beams will intercept vehicle 316, 318, 320 if the vehicles are spaced from FLS 310 by a distance greater or lesser than 100 meters. For example, if the vehicles 316, 318, 320 were spaced from the FLS 310 by a distance of 64 meters rather than 100 meters, then additional ones of antenna beams 330a–330m may intercept vehicles 316, 318, 320. Similarly, if vehicles 316, 318, 320 are spaced from FLS 310 by a distance of about 200 meters rather than 100 meters then fewer ones of antenna beams 33a–330m may intercept vehicles 316, 318, 320.

Regardless of the number of antenna beams 330a–330m or the particular ones of antenna beams 330a–330m which intercept a vehicle, the FLS must process information received by the FLS antenna to identify and track objects in the field of view of the FLS 310. When vehicles within the FLS field of view change lanes, the FLS processes information received by the antenna beams 330a–330m to properly determine that a lane change is occurring rather than determining that a new object is in the field of view of the FLS 310 or that some other condition has occurred. The FLS thus monitors signals received in the antenna beams and processes the signals received in the beams to acquire objects in the FLS field of view, track such objects, and determine the movement of objects within the field of view.

It should be noted that using the same fabrication techniques, the feed network to produce the thirteen beam pattern has an insertion loss characteristic which is greater than the insertion loss characteristic of a feed network which produces a four beam pattern. Thus, to maintain system sensitivity a tradeoff must be made between insertion loss characteristic in the feed network, the insertion loss characteristic in the switches required to select one of the plurality of beams, and antenna gain.

Figure 9:
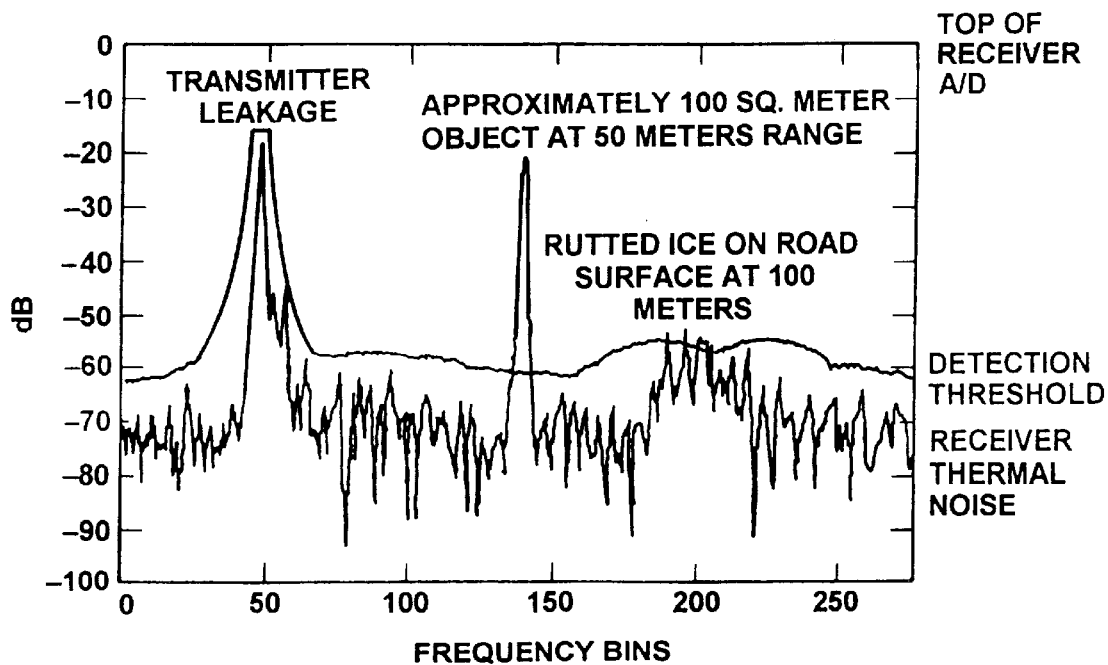
FIGS. 9 and 9A illustrate examples of electromagnetic energy returns received by the FLS of FIG. 2.
Figure 9A:
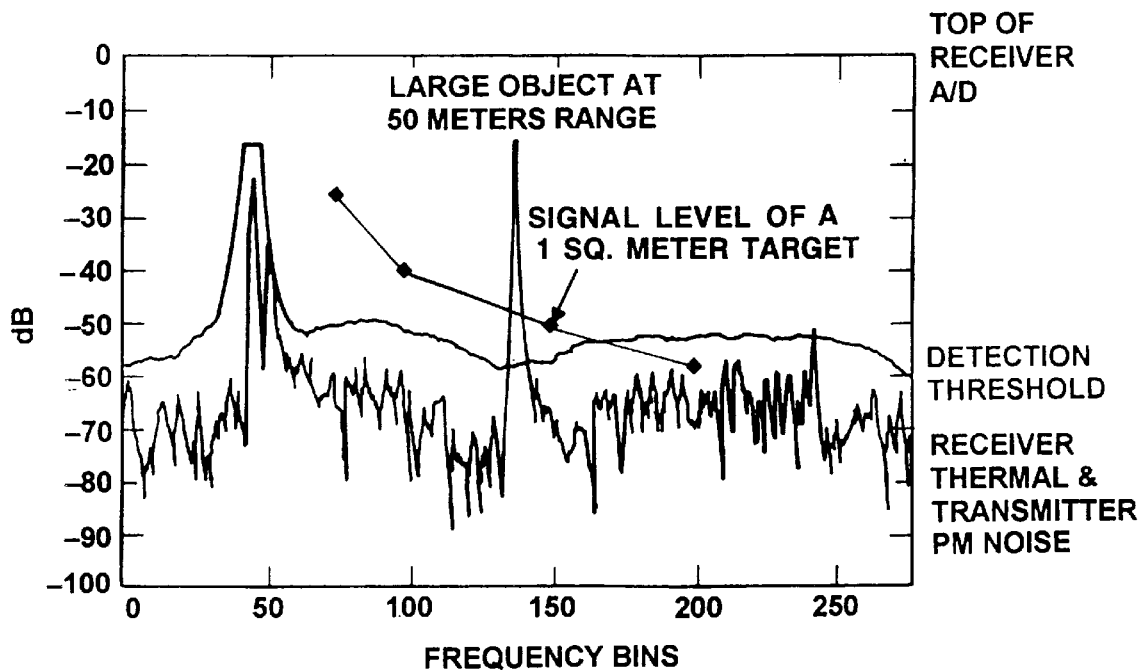

Referring now to FIGS. 9 and 9A, a plot of signal return versus frequency bin is shown. With an antenna operating at transmit and receive frequencies of about 77 GHz and utilizing an average transmitter power typically of about 10 dBm and having a receiver noise figure typically of about 6 dBm, the return from transmitter leakage as well as the return from an object having a cross-section of approximately 100 meters at a range of approximately 50 meters is shown. Also shown is a detection threshold above which the radar returns must rise to be detected by the FLS.

Figure 10:
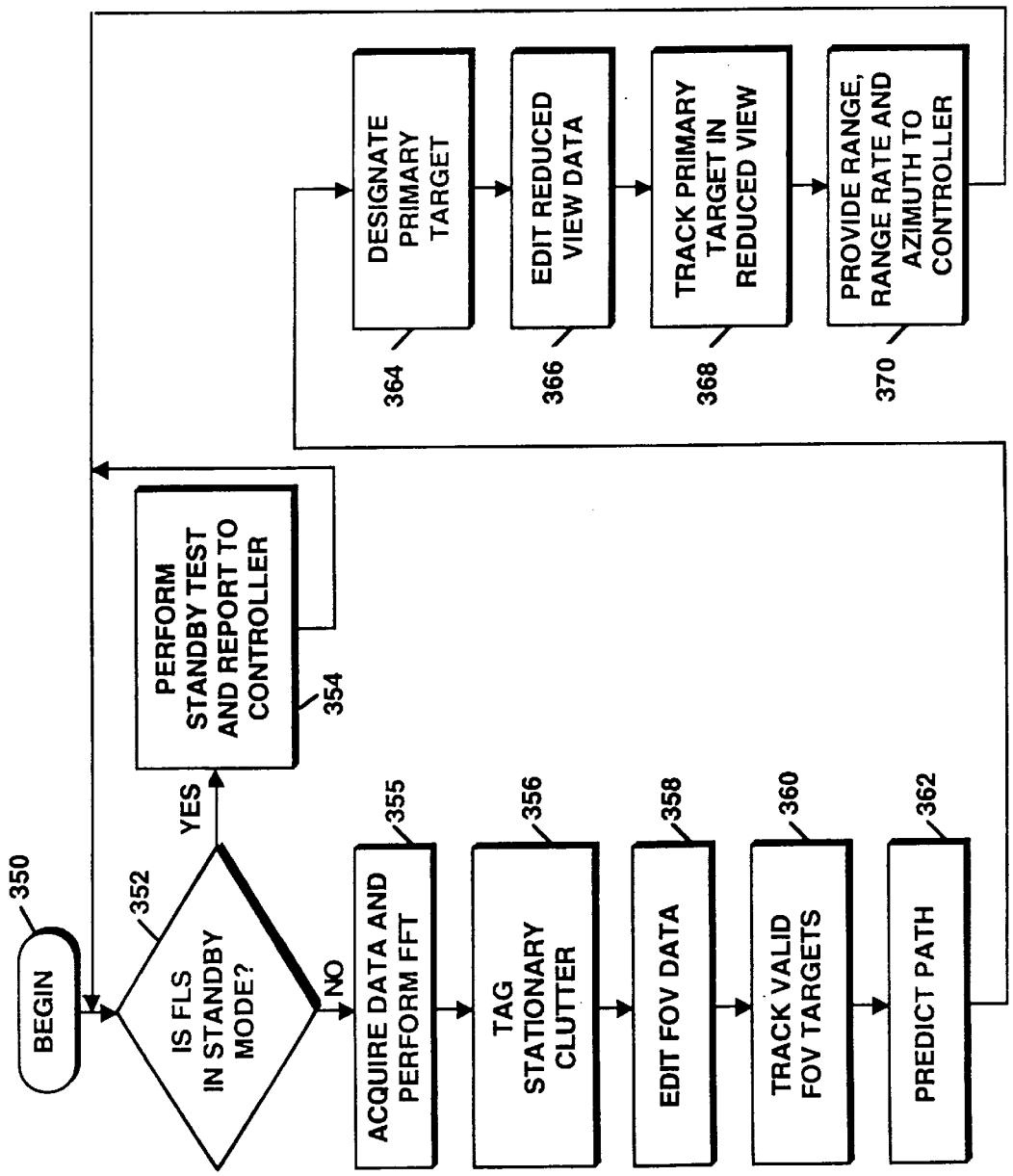
FIG. 10 is a flow diagram illustrating a processing technique performed by the DSP of FIG. 2 in detecting and tracking targets within the field of view of the FLS.

Referring to FIG. 10, a flow diagram of a method implemented by the processor 60 of FIG. 2 in detecting and tracking the primary target in the field of view of the FLS 10 is shown. The process commences in step 350, following which it is determined in step 352 whether the FLS 10 is in a standby mode of operation. Standby is a mode of operation in which the FLS 10 is powered but has not been activated by the vehicle driver. During standby mode, diagnostic tests are periodically repeated. If the FLS 10 is in standby mode, then the diagnostic test is performed in step 354 and the results reported to the vehicle 40. Thereafter, the process is repeated starting at step 352, as shown.

Alternatively, if the FLS 10 is not in standby mode, then processing proceeds to step 355 where the FLS is in an acquisition mode of operation in which target data is acquired and processed. In the acquisition mode, RF signals are received, down-converted and sampled to provide a stream of bits or digital signal samples. The DSP 60 (FIG. 2) performs a transform, such as a Fast Fourier Transform (FFT), on the signals and stores the results in a plurality of frequency bins. One of the frequency bins contains signals representing stationary clutter, and processing proceeds to step 356 in which stationary clutter in the field of view of the FLS 10 is tagged. Thereafter, in step 358, the data acquired from within the FLS field of view is edited, following which valid targets are identified and tracked in step 360. More particularly, a valid target is defined based on certain limits as to range and relative velocity. Processing steps 355, 356, 358 and 360 made be collectively referred to as acquiring and tracking targets. Data may be edited in a variety of different ways such as comparison of the data to predetermined criteria and ignoring data samples which do not meet the criteria.

It takes less than twelve milliseconds to collect, process and display data measured at each beam position. For a thirteen beam system, data latency (i.e., the time between radar updates) is less than 84 milliseconds for a target currently being tracked. For a newly detected target, the latency is less than 168 milliseconds because objects entering the field of view of the FLS require two dwells at each beam position to assess validity and establish a track file.

In step 362, the path of the vehicle on which the FLS 10 is mounted is predicted. Once the FLS 310 acquires a vehicle, the acquired vehicle's path is predicted by processing the associated radar track data along with vehicle yaw rate data, roadside clutter data, and data which compares, the path of the acquired vehicle, to the paths of other vehicles within the FLS field of view. It is also possible to use a global positioning system (GPS) to compute the position of the vehicle on which in FLS is mounted, with information concerning the FLS host vehicle position and details about the roadway path, the absolute location of the FLS host vehicle, and predicted paths can be precisely determined.

The check beam 66n of the FLS 10 receive antenna 56 (FIG. 2) points in an upward direction or "looks up." If the signal received in the check beam remains constant or gets stronger, then the vehicle is determined to be approaching a bridge. Hills and other terrain on which the FLS 10 experiences significant pitch are predicted from return signals detected in the center or other beam of the receive antenna 56 and can be derived from other sensors on the vehicle, such as a gyroscope.

In subsequent step 364, one of the tracked targets is designated as the primary, or lead target based on predetermined criteria. In the illustrative embodiment, the primary target is defined as the target having the closest range and being disposed within the same lane as the vehicle on which the FLS is mounted. If none of the tracked targets meet this criteria, then there is no primary target and the vehicle maintains the set cruise control speed.

In subsequent step 366, the tracked field of view is reduced as a function of the location of the primary target and the reduced view data is edited. In step 368, the primary target is tracked within this reduced field of view. The reduced view processing of steps 366 and 368 advantageously permits the FLS 10 to more efficiently and frequently monitor the progress of the primary target while monitoring the progress of other tracked targets more infrequently.

In step 370, the FLS 10 provides the range, range rate and azimuth output signals to the vehicle 40. This information may be used by the longitudinal control unit of the vehicle to control aspects of the vehicle operation, such as braking, and may be displayed to the driver in various forms. Thereafter, the process may be repeated starting at step 352, as shown, or may be terminated.

Figure 11:
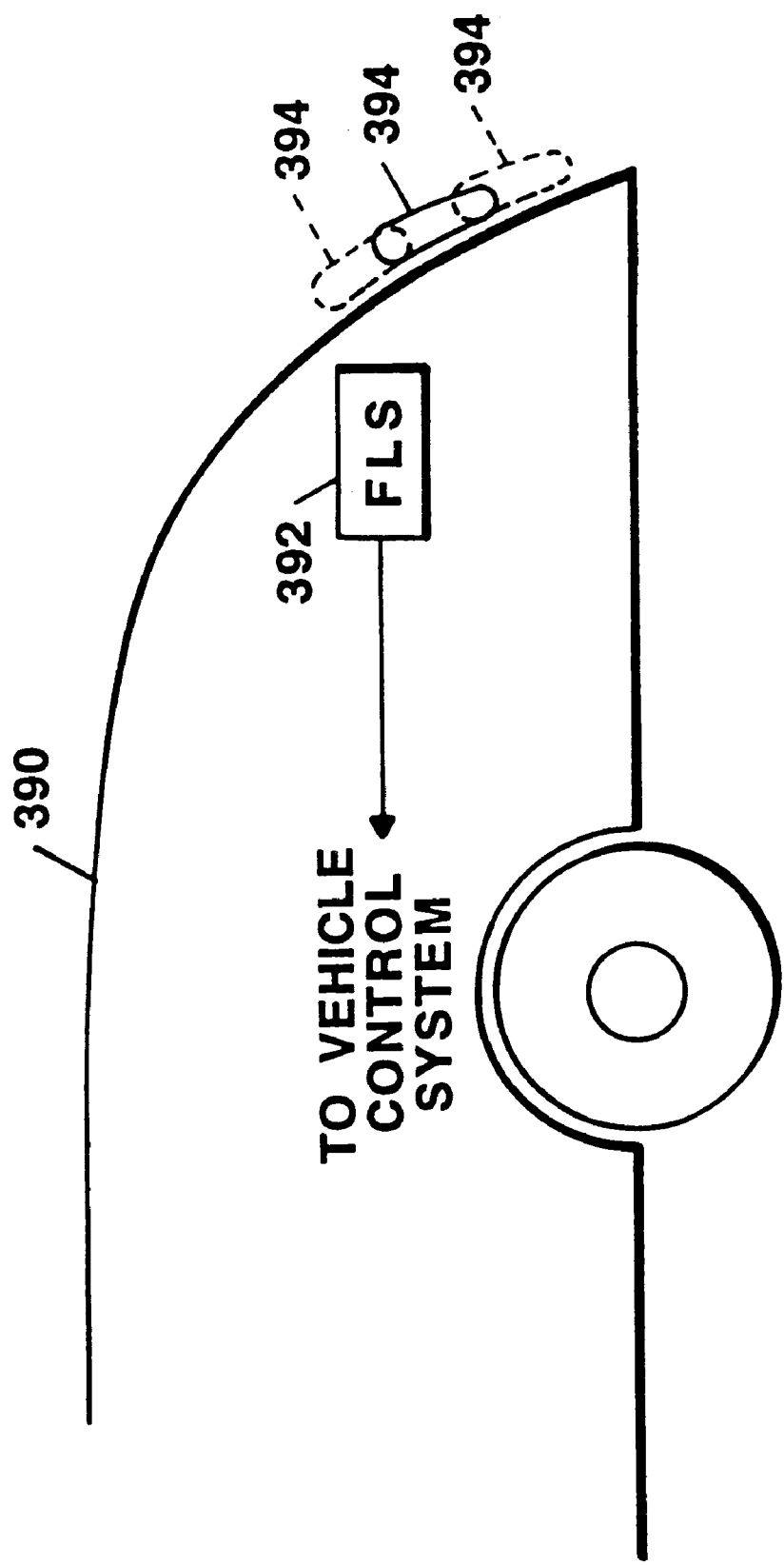
FIG. 11 is a diagram illustrating blockage of the FLS.

Referring to FIG. 11, a vehicle 390 has an FLS 392 mounted therein. Adhered to a portion of the vehicle 390 proximate the FLS 392 is debris such as dirt, ice, snow, mud or other matter. As shown, the debris appears in the path of the antenna beams provided by the FLS 392. If the debris 394 is composed of matter which highly attenuates the electromagnetic signals produced by FLS 392, then the performance of the FLS is severely degraded. Thus, it is desirable to detected the existence of such matter or debris on the vehicle.

As described above in conjunction with FIGS. 6–6E, the FLS includes a bi-static antenna comprising two adjacently disposed antennas (e.g. antennas 262, 272 in FIG. 6A). With the antennas so disposed, a portion of the electromagnetic energy transmitted by a first one of the antennas (e.g. the transmit antenna 262) is absorbed or received by the second antenna (e.g. the receive antenna 272). The portion of the electromagnetic signal so received is referred to as a leakage signal.

Leakage signals are inherent in any bi-static antenna system in which the two antennas are proximate each other. Normally such a leakage signal is undesirable and would be filtered or otherwise removed prior to processing of non-leakage signals received by the receive antenna. In this case, however, the leakage signal is used to detect blockage. That is, the presence of debris such as ice, mud, salt in the path of the transmitted signal results in the leakage signal having an unusually high signal level when received by the receive antenna. Such a leakage signal appears in a particular one of the FLS signal processor frequency bins. Thus, the signal appearing in such frequency bins exceeds a predetermined threshold level provides an indication that debris, such as debris 394, is preventing the efficient transmission of electromagnetic energy from and to the FLS 392.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A Forward Looking Sensor (FLS) comprising:
    (a) a transmit circuit comprising a transmit antenna for transmitting an RF signal, said transmit antenna comprising a plurality of radiating elements generating a plurality of radiating beams spaced relative to one another by a predetermined amount and wherein at least a portion of each antenna beam overlaps at least one other antenna beam by a predetermined amount and wherein the plurality of radiating elements generating a plurality of radiating beams comprises at least one beam pointing in an upward direction; and
    (b) a receive circuit comprising a receive antenna for receiving an RF signal.

2. The FLS of claim 1 wherein the transmit antenna comprises a field of view in the order of 15.4° and the transmit antenna comprises thirteen beams.

3. The FLS of claim 1 wherein the receive antenna comprises a plurality of radiating elements generating a plurality of receiving beams spaced relative to one another by approximately 1.1° and overlapping one another by about one-half beam width.

4. The FLS of claim 3 wherein the field of view of the FLS is on the order of 15.4° and the receive antenna comprises thirteen beams.

5. A method for aligning a Forward Looking Sensor (FLS) comprising the steps of:
    radiating an electromagnetic signal through predetermined antenna beams of a transmit antenna having multiple antenna beams; and
    receiving through predetermined antenna beams of a receive antenna having multiple antenna beams reflections from the radiated electromagnetic signal; and
    processing the received electromagnetic signal reflections to generate an alignment offset signal.

6. The method of claim 5 where in the transmit antenna providing step comprises the step of providing the transmit antenna with thirteen beams spaced relative to one another so as to intersect at approximately one-half beam width, wherein the predetermined ones of the multiple beams of the transmit antenna are beams located on opposite sides of the center line of the beam pattern and spaced from said center line by approximately 20°.

7. The method of claim 5 wherein the receive antenna providing step comprises the step of providing the receive antenna with thirteen beams, wherein the predetermined ones of the receive antenna beams are disposed on opposite sides of a center line of the receive antenna beam pattern and are spaced from said center line by approximately 20°.

8. A Forward Looking Sensor (FLS) alignment system comprising:
    a transmit antenna adapted to provide multiple beams;
    a receive antenna adapted to provide multiple beams;
    a transmitter coupled to said transmit antenna and adapted to radiate an electromagnetic signal through selected ones of the multiple antenna beams of said transmit antenna;
    a receiver coupled to said receive antenna and adapted to receive through selected ones of the multiple antenna beams of predetermined antenna beams of a receive antenna having multiple antenna beams reflections from the radiated electromagnetic signal; and processing the received electromagnetic signal reflections to generate an alignment offset signal.

9. The alignment system of claim 8 wherein said transmit antenna provides thirteen antenna beams spaced relative to one another so as to intersect at approximately one-half beam width and wherein the predetermined ones of the multiple beams of the transmit antenna are beams located on opposite sides of the center line of the beam pattern and spaced from said center line by a predetermined angle.

10. The alignment system of claim 8 having predetermined ones of the multiple beams of the transmit antenna are beams located on opposite sides of the center line of the beam pattern and spaced from said center line by a predetermined angle of approximately 20°.

11. The alignment system of claim 8 wherein the receive antenna provides thirteen antenna beams and wherein predetermined ones of the receive antenna beams are disposed on opposite sides of a center line of the receive antenna beam pattern and are spaced from said center line by a predetermined angle.

12. The alignment system of claim 11 wherein the predetermined angle is approximately 20°.

\* \* \* \* \*